United States Patent
Lim et al.

(10) Patent No.: US 6,574,599 B1
(45) Date of Patent: Jun. 3, 2003

(54) VOICE-RECOGNITION-BASED METHODS FOR ESTABLISHING OUTBOUND COMMUNICATION THROUGH A UNIFIED MESSAGING SYSTEM INCLUDING INTELLIGENT CALENDAR INTERFACE

(75) Inventors: Kang S. Lim, Danville, CA (US); Joseph A. Nguyen, Pacific Grove, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/283,772

(22) Filed: Mar. 31, 1999

(51) Int. Cl.[7] .................... G10L 15/22; H04M 1/64
(52) U.S. Cl. ............ 704/270; 704/275; 379/88.01; 379/88.03
(58) Field of Search .................. 704/275, 270; 379/88.01, 88.03

(56) References Cited

U.S. PATENT DOCUMENTS

| | | | |
|---|---|---|---|
| 4,837,798 A | 6/1989 | Cohen et al. | |
| 5,127,003 A | 6/1992 | Doll, Jr. et al. | |
| 5,206,901 A | 4/1993 | Harlow et al. | |
| 5,325,421 A | 6/1994 | Hou et al. | |
| 5,327,486 A | 7/1994 | Wolff et al. | |
| 5,388,150 A | * 2/1995 | Schneyer et al. | 379/88.19 |
| 5,430,791 A | 7/1995 | Feit et al. | |
| 5,481,645 A | 1/1996 | Bertino et al. | |
| 5,497,373 A | 3/1996 | Hulen et al. | |
| 5,652,789 A | * 7/1997 | Miner et al. | 379/201 |
| 5,668,928 A | 9/1997 | Groner | |
| 5,742,905 A | 4/1998 | Pepe et al. | |
| 5,812,865 A | 9/1998 | Theimer et al. | |
| 5,884,262 A | 3/1999 | Wise et al. | |
| 5,983,200 A | 11/1999 | Slotznick | |
| 6,018,568 A | * 1/2000 | Furman et al. | 379/93.15 |
| 6,069,890 A | 5/2000 | White et al. | |
| 6,138,100 A | 10/2000 | Dutton et al. | |
| 6,240,303 B1 | 5/2001 | Katzur | |
| 6,292,480 B1 | 9/2001 | May | |

FOREIGN PATENT DOCUMENTS

WO    WO 96/38971    * 12/1996    ............ H04M/3/46

OTHER PUBLICATIONS

JFAX.COM—Fax, voice mail, email, downloaded from www.jfax.com on Dec. 18, 1998.
General Magic/Portico—what it is, overview, features, MagicTalk Technology, network operations, FAQs, downloaded from www.genmagic.com on Dec. 18, 1998.
Michele Shannon, "The Best Telephone System for Your Business May Not Look Like a 'Phone System' At All", Undated Advertisement, Technology Watch, AltiGen Communications, Inc.

* cited by examiner

*Primary Examiner*—Tālivaldis Ivars Šmits
(74) *Attorney, Agent, or Firm*—Senniger, Powers, Leavitt & Roedel

(57) ABSTRACT

A method for permitting a user to create a plurality of outbound communication paths to a plurality of communication devices from a unified messaging system, the creating the plurality of the outbound communication paths being performed responsive to verbal input from a user through a telephone. The method includes receiving at the unified messaging system the verbal input from the user through the telephone. There is also included recognizing an action word from the verbal input which includes an action word and called party identity or contacting data. An calendar database for the callee, external to the caller's unified messaging system, is accessed via a network to determine whether a calendar entry therein temporally overlaps a time of the verbal command creating the end-to-end connection. The ascertained availability information may be provided to the caller for input whether to contact the callee. A conjunctive word with the identity or contacting data for a second callee may also be verbally input before the call table is finalized.

34 Claims, 12 Drawing Sheets

FIG. 7

| CALLED PARTY | LOCATION | PHONE NO. | CALL ORDER |
|---|---|---|---|
| MICHAEL SMITH | WORK | | 1 |
| JOHN DOE | | 831-666-1234 | 1 |
| RICHARD BROWN | | | 2 |
| MATT WHITE | GOLF COURSE | | 2 |

FIG. 10

| CALLED PARTY | LOCATION | PHONE NO. | CALL ORDER |
|---|---|---|---|
| MICHAEL SMITH | WORK | 261-335-1761 | 1 |
| JOHN DOE | | 831-666-1234 | 1 |
| RICHARD BROWN | | 335-617-1189 | 2 |
| | | | |

US 6,574,599 B1

VOICE-RECOGNITION-BASED METHODS FOR ESTABLISHING OUTBOUND COMMUNICATION THROUGH A UNIFIED MESSAGING SYSTEM INCLUDING INTELLIGENT CALENDAR INTERFACE

RELATED APPLICATIONS

The following commonly-owned, co-pending patent applications are related and are incorporated herein by reference.

Application Ser. No. 09/239,560, filed Jan. 29, 1999, entitled "INTEGRATED MESSAGE STORAGE AND RETRIEVAL SYSTEM DISTRIBUTED OVER A LARGE GEOGRAPHICAL AREA";

Application Ser. No. 09/240,367, filed Jan. 29, 1999, entitled "A SYSTEM AND METHOD FOR PROVIDING UNIFIED MESSAGING TO A USER WITH A THIN WEB BROWSER";

U.S. Pat. No. 6,263,064, issued Jul. 17, 2001, entitled "CENTRALIZED COMMUNICATION CONTROL CENTER FOR VISUALLY AND AUDIBLY UPDATING COMMUNICATION OPTIONS ASSOCIATED WITH COMMUNICATION SERVICES OF A UNIFIED MESSAGING SYSTEM AND METHODS THEREFOR";

Application Ser. No. 09/239,584, filed Jan. 29, 1999, entitled "COMPUTER-IMPLEMENTED CALL FORWARDING OPTIONS AND METHODS THEREFOR IN A UNIFIED MESSAGING SYSTEM";

Application Ser. No. 09/240,893, filed Jan. 29, 1999, entitled "INTERACTIVE BILLING SYSTEM UTILIZING A THIN WEB CLIENT INTERFACE";

Application Ser. No. 09/240,368, filed Jan. 29, 1999, entitled "A SYSTEM AND METHOD TO MANAGE PHONE SOURCED MESSAGES";

Application Ser. No. 09/240,434, filed Jan. 29, 1999, entitled "METHOD AND APPARATUS FOR NETWORK INDEPENDENT INITIATION OF TELEPHONY";

Application Ser. No. 09/240,435, filed Jan. 29, 1999, entitled "APPARATUS AND METHOD FOR DEVICE INDEPENDENT MESSAGING NOTIFICATION";

Application Ser. No. 09/240,436, filed Jan. 29, 1999, entitled "APPARATUS AND METHOD FOR CHANNEL-TRANSPARENT MULTIMEDIA BROADCAST MESSAGING";

Application Ser. No. 09/239,589, filed Jan. 29, 1999, entitled "VOICE ACCESS THROUGH A DATA-CENTRIC NETWORK TO AN INTEGRATED MESSAGE STORAGE AND RETRIEVAL SYSTEM".

BACKGROUND OF THE INVENTION

The present invention relates to communication services available via a data-centric network (i.e., a network that carries digital data) and a telephony-centric network (i.e., a network that carries telephony information such as voice, fax, pager, and the like). More particularly, the present invention relates to a computer-implemented voice-based command structure for permitting a user to employ a telephone to access the various communication services of a unified messaging system that couples to both the data-centric network and the telephony-centric network.

Both the data-centric network (e.g., a distributed computer network) and the telephony-centric network (e.g., public telephone network) have existed for some time. Broadly speaking, the data-centric network (such as the Internet) may be thought of as a global computer network that connects millions of computer terminals all over the world in such a way that digitized information can be exchanged irrespective of the different hardware and software platforms that may be utilized to gain access to the data-centric network. People and businesses around the world use the data-centric network to retrieve information, communicate and conduct business globally, and access a vast array of services and resources on-line. In a similar manner, the telephony-centric network (whether wired or wireless) may also be thought of as another global network that connects the millions of telephony devices (such as voice-oriented telephones, pagers, facsimile machines, voice mail boxes, and the like) together in such a way that a user at one of the telephony devices can readily transmit information to other telephony devices irrespective of geographic boundaries.

In the past, these two networks existed as separate domains. This is because the widely accessible data-centric network is a fairly recent phenomenon. For decades, the only network that has been available to the masses is the analog telephony-centric network, starting with the telegraph network of the nineteenth century. However, as more and more of the services traditionally offered through the telephony-centric network are being offered in a digital format by the data-centric network, the distinction between the data-centric network and the telephony-centric network begins to blur. Irrespective of whether these two networks exist as separate networks physically or conceptually going forward, the legacies of their separate existence can be seen in the various different communication services and communication devices that currently exist.

By way of example, there exist many different communication devices and services available today to allow a person to communicate to another person, e.g., telephones, facsimile machines, electronic mail (e-mail), pagers, voice mail, and the like. Generally speaking, a telephone is a communication device employed to transmit and receive speech and other sounds. A facsimile machine is a communication device to transmit and receive graphical data. A pager is a highly portable device that allows its user to receive data, and in some cases transmit limited data to a pager service provider. A voice mail box is essentially a service that allows one person to temporarily store telephone messages for retrieval by another. E-mail services allow e-mail users to transmit and receive data from computer terminals connected to the data-centric network. All these devices and services are well known in the art and will not be elaborated further for the sake of brevity.

In the aforementioned co-pending patent applications entitled "INTEGRATED MESSAGE STORAGE AND RETRIEVAL SYSTEM DISTRIBUTED OVER A LARGE GEOGRAPHICAL AREA" (Application Ser. No. 09/239,560, filed Jan. 29, 1999), "A SYSTEM AND METHOD FOR PROVIDING UNIFIED MESSAGING TO A USER WITH A THIN WEB BROWSER" (Application Ser. No. 09/240,367, filed Jan. 29, 1999), and "CENTRALIZED COMMUNICATION CONTROL CENTER FOR VISUALLY AND AUDIBLY UPDATING COMMUNICATION OPTIONS ASSOCIATED WITH COMMUNICATION SERVICES OF A UNIFIED MESSAGING SYSTEM AND METHODS THEREFOR" (U.S. Pat. No. 6,263,064, issued Jul. 17, 2001), there are described novel computer-implemented unified messaging systems and the communication services that are available therethrough. In brief, the inventive computer-implemented unified messaging system is implemented by one or more servers that are accessible by a user through either a computer interface (such as through a web browser) or a telephony interface (e.g., a telephone). Through one of the two aforementioned interfaces, a user may access the inventive computer-implemented unified messaging system and make use of the various communication services to communicate with another party. By way of example, the user may employ a telephone set to dial into his own account at the inventive computer-implemented unified messaging system, and through his own account, call, page, email, fax, or otherwise communicate with another party.

If the telephone interface is employed to access the computer-implemented unified messaging system and to employ the various communication services available therewith, the user typically employs the keypad associated with the telephone set to navigate through the option menus provided and to furnish the contact information of the target party. By way of example, the user may, after proper authentication and in response to a system prompt, enter at the keypad a digit or a sequence of digits indicative of the communication service desired (e.g., "1" for placing a call, "2" for sending a page, etc.). Further, the user may, again in response to a system prompt, enter at the keypad another digit or sequence of digits indicative of the contact information (e.g., "831-123-4567") to allow the servers of the computer-implemented unified messaging system to establish communication using the communication service(s) indicated.

It is recognized, however, that this method of accessing the computer-implemented unified messaging system and its various communication services can be further improved. More specifically, it is recognized that certain classes of people, e.g., those invalid or handicapped, may have difficulties using the keypad to access the various communication services of the unified messaging system. Furthermore, with the rising popularity of mobile telephones, many people routinely employ mobile telephones to communicate while in automobiles. Although it is recommended that drivers pull off the road while using their mobile phones, it is recognized that most drivers unwisely continue to use their mobile telephone sets while driving. As such, these drivers often have to divert their eyes and hands off the road to dial the keypad, a situation which reduces driver attentiveness and increases the possibility for mishaps.

Voice-based commands for telephone systems have been in use for some time. However, it is observed that these systems tend to be extremely limited and/or poorly adapted for use in a complex system, such as in a unified messaging system, in which a large range of both data-centric and telephony-centric communication services and communication options are available. Further, existing voice-based command systems, such as those employed in certain automated response systems, tend to be quite primitive. That is, they tend to be poorly adapted at handling complex communication requests, which may involve multiple telephone numbers/email addresses, multiple parties, and different temporal orders for the various individual communication circuits.

In view of the foregoing, there are desired improved techniques for permitting a user to employ voice-based commands to access the various data-centric and telephony-centric communication services of a computer-implemented unified messaging service and/or to issue, in a natural and intuitive manner, complex communication requests involving more than one telephone number/email address.

SUMMARY OF THE INVENTION

The present invention relates, in one embodiment, to a method or creating an end-to-end connection between a first telephone and a communication device through a unified messaging system. The creation of the end-to-end connection between the first telephone and the communication device is performed responsive to verbal input from a user of the first telephone. The method includes receiving at the unified messaging system the verbal input from the user through the first telephone. There is also included detecting an action word from the verbal input after the performing speech (formerly "voice") recognition. The action word is indicative of a communication service desired by the user in creating the end-to-end connection. Additionally, there is included detecting at least one of a called party identity and contacting data from the verbal input after the detecting the action word. Furthermore, there are included entering the one of the called party identity and the contacting data in a record of a call table and finalizing the call table after the user finishes with the verbal input. Finalizing the call table ensuring that the record of the call table includes service-appropriate contact information to permit the unified messaging system to create an outbound communication path of the end-to-end connection using the service-appropriate contact information, wherein finalizing includes ascertaining whether a calendar entry in a calendar database of a called party temporally overlaps a time of creating the outbound communication path for each record.

In another embodiment, the invention relates to a method for permitting a user to create a plurality of outbound communication paths to a plurality of communication devices from a unified messaging system, the creating the plurality of the outbound communication paths being performed responsive to verbal input from a user through a first telephone. The method includes receiving at the unified messaging system the verbal input from the user through the first telephone and performing voice recognition on the verbal input. There is also included detecting an action word from the verbal input after the performing voice recognition. The action word is indicative of a communication service desired by the user in creating the end-to-end connection. Additionally, there is included detecting at least one of a first called party identity and first contacting data from the verbal input after the detecting the action word. Furthermore, there are included entering the one of the first called party identity and the first contacting data in a first record of a call table and detecting a conjunctive word after the detecting the at least one of the first called party identity and the first contacting data. The method further includes detecting at least one of a second called party identity and second contacting data from the verbal input after the detecting the conjunctive word. Furthermore, there is included entering the one of the second called party identity and the second contacting data in a second record of a call table and finalizing the call table after the user finishes with the verbal input. Finalizing the call table ensuring that each record of the call table, including the first record and the second record, includes service-appropriate contact information to permit the unified messaging system to create an outbound communication path for the each record, wherein finalizing includes ascertaining whether a calendar entry in a calendar database of a called party temporally overlaps a time of creating said outbound communication path for each record.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 illustrates, in accordance with one embodiment of the present invention, a call table for storing information regarding calls to be made by the unified messaging system in response to the subscriber's verbal input.

FIG. 10 shows the exemplary call table of FIG. 7 after the phone numbers have been ascertained.

DETAILED DESCRIPTION OF PREFERRED EMBODIMENTS

Figure 1:
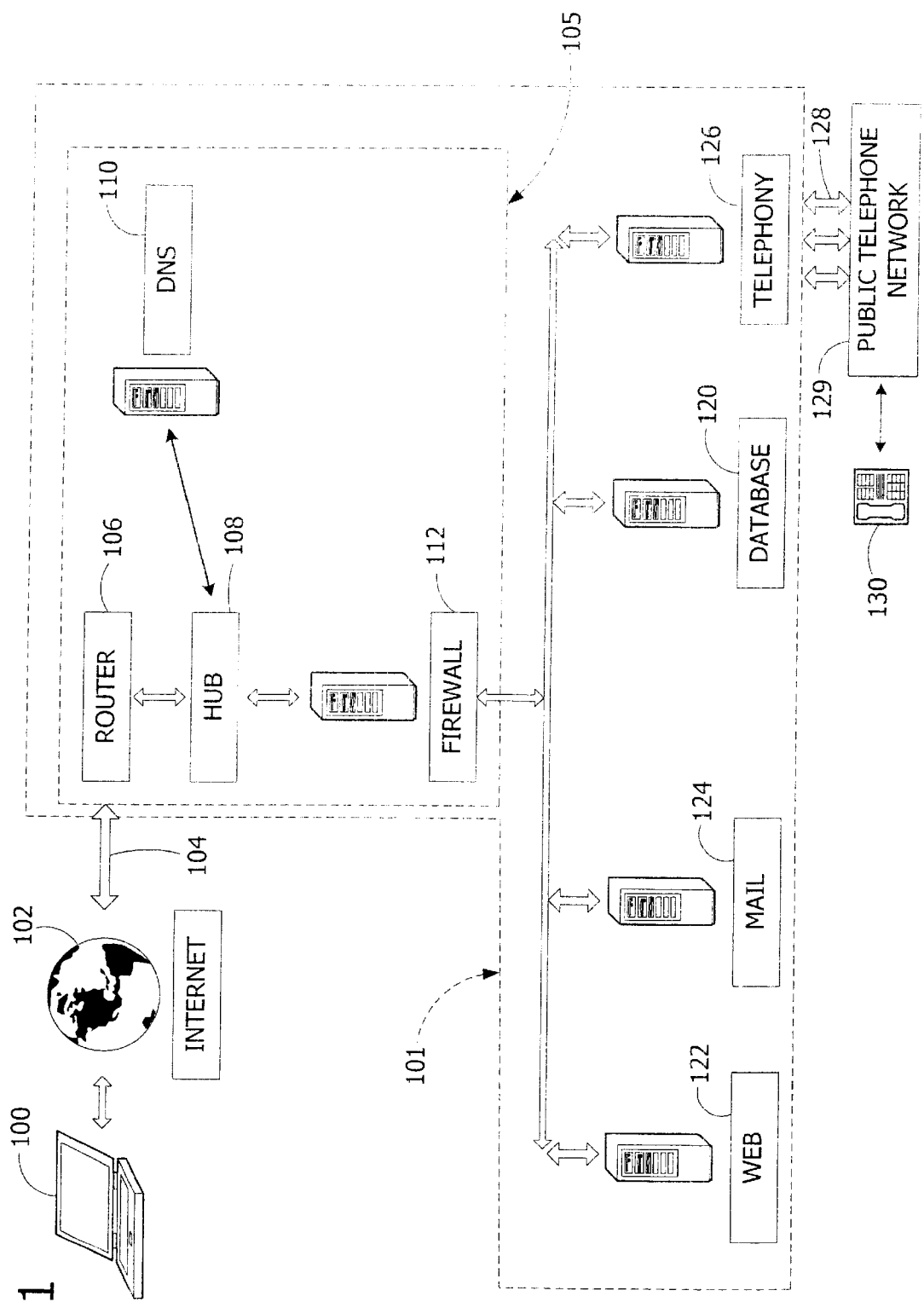
FIG. 1 depicts, in one embodiment, the general overview of the unified message system.

The present invention will now be described in detail with reference to a few preferred embodiments thereof and as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

In the aforementioned co-pending patent applications entitled "INTEGRATED MESSAGE STORAGE AND RETRIEVAL SYSTEM DISTRIBUTED OVER A LARGE GEOGRAPHICAL AREA" (Application Ser. No. 09/239, 560, filed Jan. 29, 1999), and "A SYSTEM AND METHOD FOR PROVIDING UNIFIED MESSAGING TO A USER WITH A THIN WEB BROWSER (Application Ser. No. 09/240,367, filed Jan. 29, 1999), which are all incorporated herein by reference, some inventive unified messaging systems and their various services and features are disclosed. Although the present invention may be implemented on any unified messaging system, reference may be made to the above-mentioned co-pending patent applications for details pertaining to preferable unified messaging systems on which the present invention may be implemented.

In general terms, a unified messaging system benefits a user by integrating various communication services, which up to now have existed as separate services. The integration facilitates simplified management, billing, and more importantly the ability to efficiently route communication among the various services. With a unified messaging service, a user may, for example, specify that an incoming facsimile be forwarded to a computer for viewing or to a printer for printing, listen to e-mail messages through a telephone, receive pager notification when a facsimile is received, or the like. Within limits, a unified messaging system allows messages to be received, stored, retrieved, and/or forwarded (in the original format or in a different/abbreviated format) without regard to the communication devices and/or networks (i.e., data-centric vs. telephony-centric) employed for the original transmission of the messages.

As mentioned, a unified messaging system unifies the various communication services that have, up to now, existed as separate services in separate networks. Thus a user may employ a single device, e.g., a telephone, to access the various communication services such as facsimile, page, email, and the like. This is unlike existing arrangements in which, for example, a user must employ a facsimile machine coupled to the telephony-centric network for faxing documents to a destination facsimile machine, and a computer terminal for sending an email message to a destination email address.

A unified messaging system implemented in a data-centric network takes the unified messaging system concept a step further by internally storing and manipulating the messages in a digital format irrespective of whether the message was received and/or will be sent in the digital or analog format. As is well known, digital formatting increases the flexibility with which information contained in the messages can be analyzed, stored, manipulated, and/or routed among the various communication devices. More importantly, the implementation of the unified messaging system in a data-centric network permits the subscriber to access his account through any computer or telephone irrespective of the geographic location from which the accessing and/or modifications are made, and to employ, for example, the telephone to access communication services which traditionally cannot be accessed by a telephone alone.

To facilitate discussion, FIG. 1 depicts, in accordance with one embodiment of the present invention, the general overview of a unified message system 101. With reference to FIG. 1, there is shown a user computer 100, representing a computer that may be employed to access the communication services offered by the unified messaging system. Although user computer 100 is shown to be a desktop personal computer (such as an Intel-based personal computer), user computer 100 may in fact represent any computing device capable of accessing the data-centric network (represented by reference 102 in FIG. 1). By way of example, user computer 100 may represent a laptop computer, which may access the data-centric network either through wired connections or in a wireless manner. As another example, user computer 100 may represent a personal digital assistant (PDA) or a palm-top computer, or a thin-client type computer.

Data-centric network 102 may represent any computer network which couples together users from geographically dispersed locations. In a preferred embodiment, data-centric network 102 represents the Internet, although data-centric network 102 may also represent a Wide Area Network (WAN), a Local Area Network (LAN), a Virtual Private Network (VPN) or any similarly suitable networking arrangement that allows users to log in from a remote terminal.

With reference to FIG. 1, there is shown data link 104, representing the high speed data lines for transmitting and receiving data between unified messaging system 101 and data-centric network 102. In a preferred embodiment, data link 104 is implemented by high speed T1 data lines, although other types of data lines such as fiber optics may also be employed. A network interface system 105 couples data link 104 to the remainder of unified messaging system 101, which is shown to include four servers as shown (the servers are discussed later herein).

Network interface system 105 represents the interface system that ensures data is properly transmitted and received between unified messaging system 101 and data-centric network 102. Of course network interface system 105 may vary depending on the implementations of the data-centric network and/or the portion of unified messaging system 101 to which network interface system 105 is coupled.

In the case of the Internet, one current preferred implementation of network interface system 105 may include a router 106, a hub 108, a DNS (Domain Name System) facility 110, and a firewall 112. Typically, the router 106 is a piece of hardware or software that examines the IP address of data packets and determines the routing of the data packets based on the IP address.

Router 106 acts cooperatively with hub 108 and DNS facility 110 to permit properly addressed data packets to be received through firewall 112. Router 106, hub 108, DNS facility 110, and firewall 112 are conventional and will not be belabored here for the sake of brevity.

At the heart of the unified message system are a set of servers which are coupled to exchange data and are connected to firewall 112 and the public telephone network. Typically, a server represents a computer that processes data for use by other data-consumer devices (such as other servers, computers or any of the communication devices through a proper interface circuit). There is shown a database server 120, which is employed to, among other tasks, organize and maintain the subscriber communication profile database. The subscriber communication profile database itself may reside with database server 120. Further, the communication profile database may include a data store of subscriber accounts and communication option settings associated therewith. Incoming messages to a particular subscriber or outbound messages from that subscriber are formatted and routed in accordance with the communication option settings stored in the subscriber communication profile database. Properly authorized changes to the communication option settings will be reflected in the communication option settings stored in the subscriber communication profile database and employed to handle subsequent messages (whether incoming or outbound). In one preferred embodiment, among the information stored with the subscriber communication profile for each subscriber is a pointer to an electronic address book where the subscriber may keep contacting information (e.g., an electronic address book) as well as the list of communication services a particular subscriber is authorized to use. By way of example, some subscriber may not wish to pay to subscribe to the paging service and should not therefore be allowed to employ the unified messaging service for the purpose of sending out a page.

Subscriber authentication data may be employed to access to a subscriber communication profile database. Subscriber authentication data may be stored in the database server. Subscriber authentication may be accomplished using several techniques. For example, a numeric password, an alpha-numeric password, a hidden code wherein the password is randomly hidden in a string (i.e., xxxppppxx, xppppxxxx, etc.) and biometrics (e.g., retina scans, hand prints, palm prints, finger prints, voice recognition, etc.).

A web server 122 is employed to facilitate interaction between unified messaging system 101 and data-centric network 102. Web server 122 represents one of the system-side servers (i.e., a server that handles the exchange of data with the user's computer via the data-centric network) and is employed, for example, to present to user computer 100 the log-in screen when a subscriber employs user computer 100 to access the unified messaging service. Once that subscriber is properly authenticated (e.g., through a password procedure or another suitable authentication procedure), web server 122 first communicates with database server 120 to obtain the current communication option settings for that subscriber, as well as current status of messages (e.g., the number of emails unread, whether there is any voicemail to be checked, etc.) and to display the current communication option settings and current status of messages to the subscriber in an individualized web page to the subscriber for review. The subscriber may then access the communication services offered via the unified messaging service. By way of example, the subscriber may, through a web application, employ web server 122 to read his emails, check his voicemails, and the like.

In one preferred embodiment, web server 122 is employed to store all messages pertaining to a particular subscriber. The messages are stored as files in web server 122. These messages may represent, for example, voice files, facsimiles, e-mail messages, voice mail messages, or the like. Pointers in database server 120 facilitate access to the stored messages in web server 122. However, it is contemplated that the messages may be stored in any of the servers discussed herein and/or in a separate storage device accessible by the servers.

An e-mail server 124 is employed to process incoming and outbound e-mail messages. By way of example, e-mail server 124 may be employed to format/translate the e-mail messages so that they can be properly transmitted to other e-mail systems and understood thereat. For incoming messages, e-mail server 124 may be employed to format/translate the information transmitted via the incoming e-mail and to prepare them for use by other data consumers. For outbound emails, e-mail server 124 prepares the header and the body of the outbound email message, including any attachment (which may be a text file or a multimedia file) for transmission to the destination email address.

Figure 2:
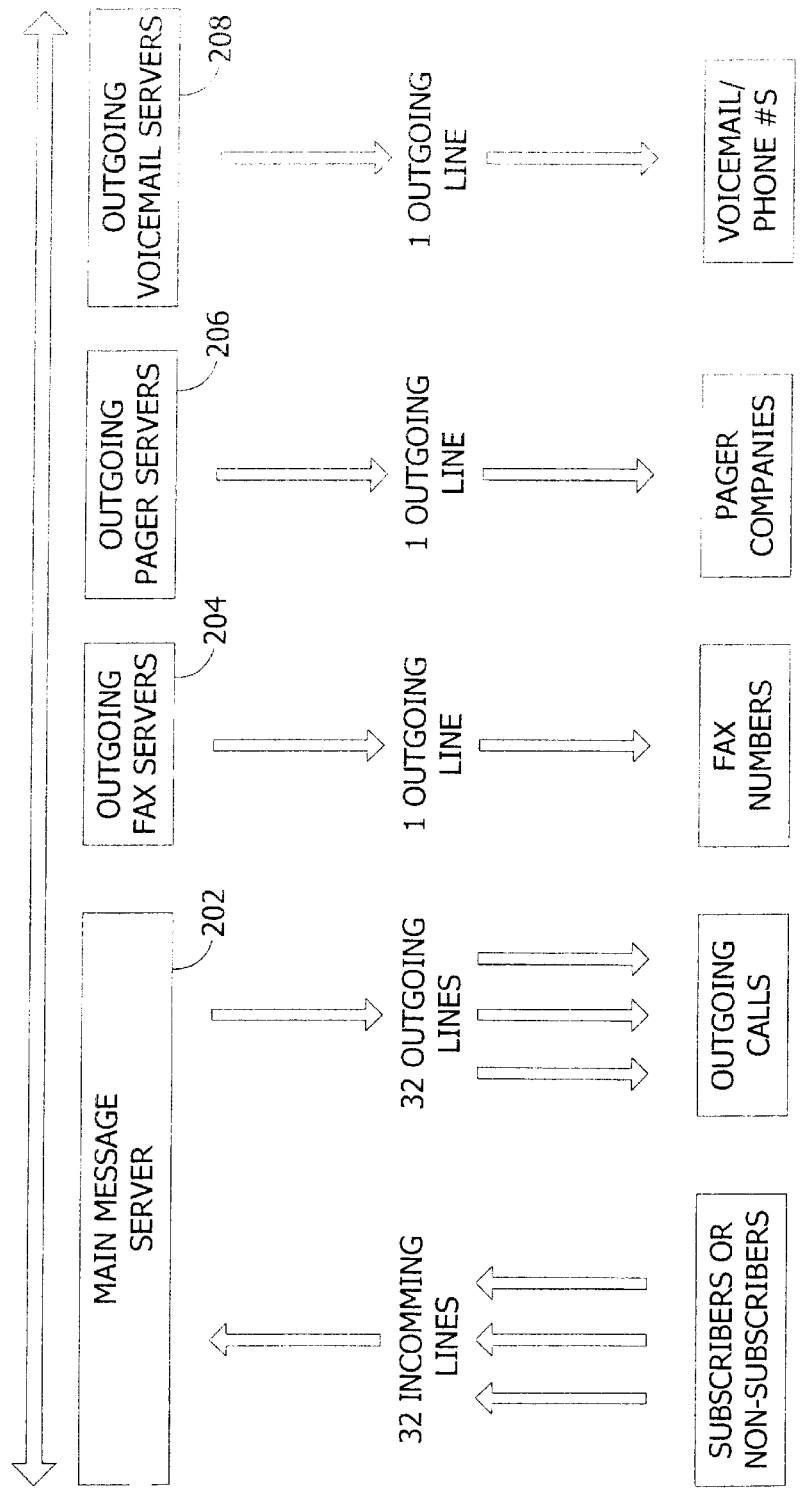
FIG. 2 illustrates, in one embodiment, how the 48 telephone lines provided per T1 link may be divided among the servers of the telephony server.

A telephony server 126 is shown coupled between telephone link 128 and the remainder of the unified messaging system and may include any number of servers, such as are shown in FIG. 2. In a manner analogous to web server 122, telephony server 126 represents a system-side server (i.e., a telephony server that handles the exchange of information with the user via the telephony-centric network) and is employed to facilitate interaction between unified messaging system 101 and telephony-centric network 129. Telephony server 126 may be employed to, for example, translate the telephone signals (such as the dialed digits, whether entered through the keypad or verbally input and then detected into a digital format for the purpose of authenticating and allowing subscriber access. Telephony server 126 may also be employed to translate such dialed digits and/or other telephone signals (such as facsimile tones or verbal commands) into digital data, which may then be employed to facilitate handling of messages and/or the communication option settings. In one embodiment, Dialogic board models D 240 SC-TI, D 480 SC-1, CP-4/SC, CP-6/SC, and/or CP-12/SC (available from Dialogic Corporation of Parsippany, N.J.) are employed to facilitate the translation between telephone signals and digital data.

Telephony server 126 preferably also includes hardware and/or software to perform voice recognition. Exemplary speech (formerly "voice") recognition technologies that are capable of recognizing human speech and transcribe spoken words to digital data (including text) may be found in commercially available speech recognition engines, including, without limitation, those currently employed in the IBM ViaVoice Dictation family of products (available from IBM Corp. of Armonk, N.Y.) and in the Dragon Dictate family of products (available from Dragon Systems, Inc. of Massachusetts). Note that this recognition/transition produces digital data that is more than just a mere digitized version of the verbal input. The recognition engines in fact recreate the words verbally input so that their meaning and/or context can be further analyzed.

Once translation is performed, software within telephony server 126 employs the digital data to decide how to handle the communication request. By way of example, the user may employ voice-based commands to initiate, through a telephone, an outbound call to a called party, or send a facsimile to a given facsimile machine. Depending on the communication services desired, telephony server 126 operates cooperatively with its servers and/or the email server to accomplish the end-to-end connection. If the subscriber, through predefined dialing sequences or verbal commands, indicates that he wishes to review and/or modify the communication option settings, software within telephony server 126 operates cooperatively with database server 120 to affect the change to the communication option settings. Once the communication option settings are reflected in the subscriber communication profile database stored in database server 120, the new communication option settings are consulted each time a message needs to be handled by the unified messaging system.

Telephony-centric network 129 represents any telephone network which couples together telephony-type communication devices (e.g., facsimile machines, pagers, telephones) from geographically dispersed locations. By way of example, telephony-centric network 129 may represent a plain old telephone system (POTS), a wired telephone network popularly known as Public Service Telephone Network (PSTN) or a cellular network or a combination thereof. Telephony-centric network 129 is well known and will not be discussed in great detail here for the sake of brevity.

A telephone 130 is shown coupled to telephony-centric network 129. In reality, it should be understood that a wide variety of telephony devices (which are not shown to simplify the illustration) are connected to telephony-centric network 129. Some of these exemplary communication devices are, as mentioned, facsimile machines, pagers, cellular telephone sets, wired telephone sets, and the like.

Telephone link 128 represents the telephone communication channels for transmitting and receiving telephone signals between unified messaging system 101 and telephony-centric network 129. In a preferred embodiment, telephone link 128 represents high bandwidth T1 telephone links, although other types of communication links may also be employed. Note that there is no requirement that the data transmitted on telephone link 128 be analog. In fact, with the upcoming convergence of data networks and telephone networks, the telephony information that traverses telephone link 128 may well be digital (in which case, telephony server 116 will be adapted to handle digital telephony signals instead of analog telephony signals). As a noteworthy point, it is expected that as data networks and telephone networks converge, the relevant functionality represented by the servers herein still applies, albeit with the proper modification to handle an all-digital combined data/telephone network.

FIG. 2 illustrates, in accordance with one embodiment of the present invention, how the 48 telephone lines provided per T1 link may be divided among the servers of telephony server 126. As shown in FIG. 2, 45 of the telephone lines may be employed by a main message server 202 to handle the incoming/outbound voice calls, the incoming voice mail messages, and the incoming facsimiles. Of the 45 telephone lines, 32 may be provisioned for the subscribing or non-subscribing users to dial into the unified messaging system, and the other 13 telephone lines may be employed to allow outbound calls to be made from within the unified messaging system. The outbound calls may, for example, be calls destined for the unified messaging system but are rerouted out of the unified messaging system in accordance with a subscriber's communication option settings. The outbound calls may also be originated by the subscriber, who dials into his own account at the unified messaging system (using a toll or toll-free access number assigned to his account, for example) and requests one or more outbound calls be made therefrom to some destination numbers (for example by punching in the "#" key after authentication, followed by the destination number(s) or by verbally inputting the command "CALL" to be followed by the verbally input phone number (s), called party or parties and/or location(s)). In this manner, the subscriber may employ the unified messaging service as a type of personal calling card service.

One of the 48 telephone lines of the T1 link may be reserved for outbound facsimile transmission, which is handled by an outbound facsimile server 204. Another telephone line may be apportioned for the outbound paging service, which is handled by an outbound pager server 206. Outbound voice-mail messages are handled by voice mail server 208, which is coupled to another one of the 48 telephone lines of the T1 link as shown. Note that any of the outbound facsimile server, outbound pager server, outbound voice mail server, and even the email server may be employed to send out messages input by the subscriber via the telephone (using the appropriate voice recognition product).

To elaborate, outbound voicemails are voice messages sent to a voicemail phone number which may be created via the web or the telephone. Outbound voicemails may be new voicemails, replies to other messages or forwarded as a voicemail. For example, when forwarding a voicemail via the web, the voicemail may be treated as an attachment to a speech synthesized text message with the recipient address as a telephone number. Outbound voicemail servers may be geographically distributed and communicate with each other via internet in such a way that the server nearest the destination voicemail phone number may be assigned to send the voicemail via either a circuit-switched call or packet-switched call.

Outbound facsimiles are facsimile messages sent to a facsimile telephone number which may be created via the web or the telephone. Outbound facsimiles may be new facsimiles, replies to other messages, forwarded as a facsimile or call-forwarded as a facsimile in which the system stores the incoming facsimile and then forwards the facsimile to the subscriber's facsimile-forward number. For example, when forwarding a facsimile via the web, the facsimile may be treated as an attachment to Tiff conversion of a text message with the recipient address as a phone number. When a facsimile is created via the telephone, such as the case when the subscriber calls into the unified messaging service for the purpose of sending a facsimile to another person, the voice file from the subscriber may be transcribed by an appropriate speech recognition product, optionally reread to the subscriber for correction and/or editing, to be sent out as a text file via the facsimile server. Like outbound voicemail servers, outbound facsimile servers may also be geographically distributed. Outbound facsimile servers may communicate with each other via the Internet in such a way that the server nearest to the destination facsimile telephone number may be assigned to send the facsimile via either a circuit-switched call or packet-switched call.

Outbound pages are paging messages sent to a pager number which may be created via the telephone either by the caller or by the system when sending notification. When a page is created via the telephone, such as the case when the subscriber calls into the unified messaging service for the purpose of sending a page message to another person, the voice-based page message (e.g., the alphanumeric message to be sent) from the subscriber may be transcribed by an appropriate speech recognition product, optionally reread to the subscriber for correction and/or editing, to be sent out to the destination pager device as a text file via the outbound page server. Like outbound voicemail servers, outbound page servers may also be geographically distributed. Outbound page servers may communicate with each other via the internet in such a way that the server nearest to the destination pager telephone number may be assigned to send the page via either a circuit-switched call or packet-switched call.

There may also be outbound emails and their servers that do not involve circuit switched calls. Some pagers may be alphanumerical type and can receive messages as an email. In this case, the outbound pager server may delegate these requests to the outbound email servers.

In one embodiment, messages sent to the unified messaging system may be stored in web server 122 with pointers to these messages being held in database server 120. The above mentioned set of servers (outbound facsimile server, outbound pager server and outbound voice mail server) and the email server are arranged to make requests to the database server for outbound messages stored on the web server. If an outbound message is detected by a server, software within the server decides how to handle the outbound message according to the communication option settings obtained from the subscriber communication profile database. Again, a Dialogic board may be employed, in one embodiment, to facilitate the translation between the stored data and the outbound telephone signal.

All types of outbound message requests (voicemail, facsimile, email, pages) are queued in the database server. These requests can also be associated with a delivery time (e.g., the default time is "now"). Each type of request may be stored in a separate queue. An outbound server of a particular type of message periodically checks its queue from the database server to see if any request's time is up for delivery.

It should be noted that FIG. 2 shows only one exemplary way to divide the T1 telephone lines among the various servers of telephony server 126. Depending on the traffic pattern generated by subscribing and non-subscribing users of the unified messaging system, these lines and servers may be scaled as necessary.

Figure 3:
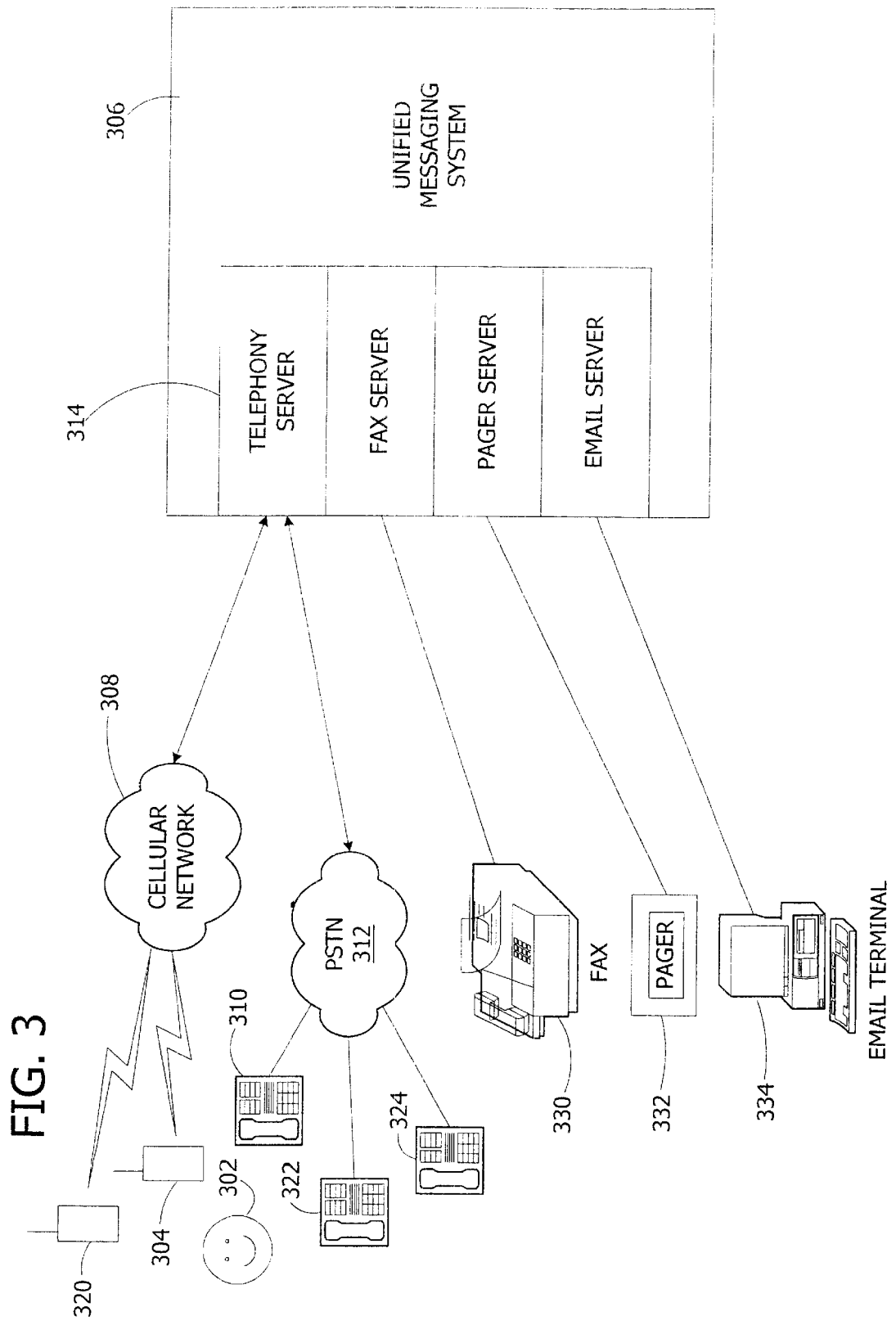
FIG. 3 depicts, in accordance with one aspect of the present invention, the various communications options available to a subscriber of the computer-implemented unified messaging system.

FIG. 3 depicts, in accordance with one aspect of the present invention, the various communications options available to a subscriber of the computer-implemented unified messaging system. As seen in FIG. 3, a subscriber 302 may employ either a mobile phone 304 to access a computer-implemented messaging service 306 through a mobile network 308. In a similar manner, subscriber 302 may also employ wired phone 310 to access computer-implemented unified messaging system 306 through the wired telephone network infrastructure, such as through a PSTN 312 as shown. Typically, access may be made by dialing the telephone number assigned to the subscriber, which forms a call circuit between the subscriber's phone and computer-implemented unified messaging service. Preferably, such dialing is made via voice commands using the procedures described herein below (e.g., "CALL Thinklink" wherein the word "Thinklink" is associated with the subscriber's telephone number). Once the call circuit to the telephony server within computer-implemented unified messaging system 306 is completed, the subscriber, if properly authorized, may indicate to telephony server 314 his desire to employ the outbound communication services (such as outbound pager service, outbound fax, outbound emails, outbound voicemails, or the like) of computer-implemented unified messaging system 306. Preferably again, the user may indicate his choice of the outbound communication service (e.g., call, fax, email, page, teleconference, or the like) using voice commands. The user may also verbally indicate the called party/parties to be contacted, the contact information (if any), and the message to be transmitted (if appropriate).

As mentioned, telephony server 314 preferably includes hardware and/or software to perform voice recognition and parsing of the verbal information to determine which server (e.g., outbound page server, outbound fax server, or outbound email server, etc.) should be employed to initiate the outbound communication and the contact information required to perform the outbound communication. If the contact information is not provided by the subscriber, telephony server may access the subscriber's address book to attempt to locate the contact information to perform the requested outbound communication (preferably after confirming the found contact information with the subscriber).

As seen in FIG. 3, the outbound communication from subscriber 102 via the telephone and computer-implemented unified messaging system 306 may be made using any of the communication services shown. By way of example, subscriber 102 may, through verbal commands, establish a call to one or more of mobile phone 320 and wired phones 322 and 324. Subscriber 102 may also send a fax to a facsimile machine 330, a page message to a pager 332, an email to an email address to be retrieved at an email terminal 334, all through verbal commands via the telephone.

Note that from the subscriber's perspective, the specific device to which the message is sent is irrelevant. That is, the subscriber need not be concerned with whether his telephone is compatible with any of the devices to which he wishes to send his message. As long as the appropriate server can establish contact with the appropriate destination device using the contact information provided by the subscriber or obtained from the address book, the subscriber can communicate with any of the devices shown in FIG. 3 through computer-implemented unified messaging system 306 (via the telephone and voice commands).

Typically, the subscriber announces, as one of the first words in his communication request, an action word indicative of the type of communication service desired (e.g., "CALL," "EMAIL," "FAX," or the like). The action word determines which outbound server (e.g., the outbound telephony server, the outbound email server, the outbound fax server, or the like) is involved in establishing the outbound communication path. For ease of discussion, the following figures will be made with reference to outbound calls made by the subscriber after accessing his account at the unified messaging system. In this case, the telephony server is employed to establish the outbound connection in accordance with the telephone number(s) and/or other contact information input by the subscriber. However, analogous procedures may be employed by the outbound email server, the outbound fax server, the outbound pager server and/or the outbound voicemail server. Once the telephony server acquires and transcribes the contact information (e.g., phone number or email address) as well as the message to be sent into a digital format understood by the servers and make the contact information and/or message available to the server using the inventive architecture disclosed herein, the formatting and protocol handling required on the part of the servers to send out the message may be performed in any manner.

Figure 4:
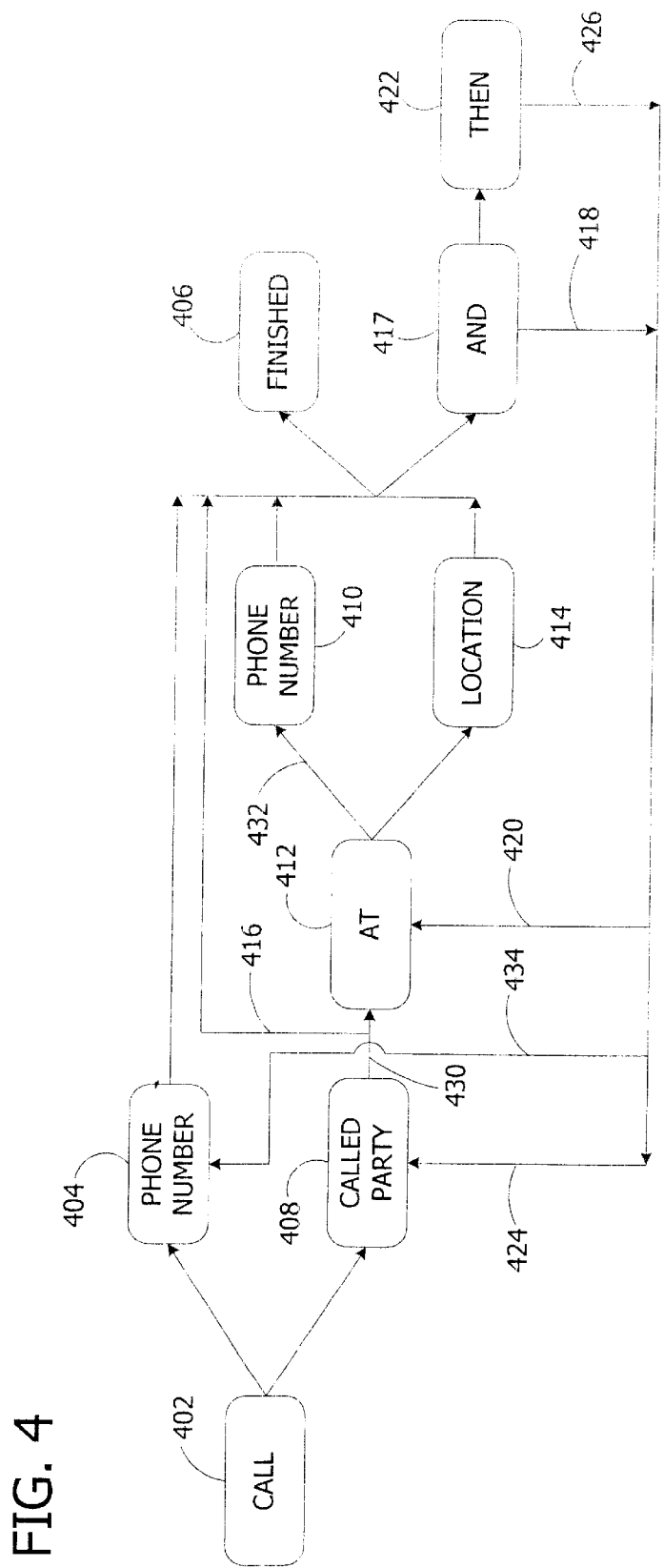
FIG. 4 illustrates, in accordance with one embodiment of the invention, a simplified syntax of some typical voice commands that may be employed to establish outbound calls through the computer-implemented unified messaging system.

FIG. 4 illustrates, in accordance with one embodiment of the invention, a simplified syntax of some typical voice commands that may be employed to establish outbound calls through the computer-implemented unified messaging system. Prior to issuing the verbal commands to establish outbound calls, the subscriber is assumed to have accessed his account at the unified messaging system and has been properly authenticated.

The subscriber may first verbally announce with an appropriate action word (e.g., "CALL") that he wishes to initiate an outbound call (402). After indicating that he wishes to initiate an outbound call, the subscriber may verbally follow up with the destination telephone number in block 404. Since the contact information is provided, there is sufficient data for the telephony server to establish an outbound call circuit. An example of such a syntax may be "CALL 831-111-2222." The subscriber may then issue a verbal command to initiate the call using the furnished telephone number (such as "DIAL," "GO," or the like) to signal to the telephony server that the verbal command is finished (block 406). Thereafter, the telephony server may dial the called party to establish the outbound circuit. If answered, the outbound circuit is then connected by the telephony server to the incoming circuit to complete the end-to-end connection. Thereafter, the conversation may proceed.

Alternatively, the subscriber may verbally follow up after the action word of block 402 with the identity of the called party (which may be a person or an entity). Inputting of the called party identity is shown in block 408 of FIG. 4. The telephone number for the called party may then be provided (block 410) after the preposition "AT" (shown in block 412 of FIG. 4). An example of such a syntax may be "CALL MICHAEL SMITH AT 831-111-2222" Because the telephone number is provided, there is sufficient information for the telephony server to establish an outbound call circuit since the identity of the called party may be deemed superfluous in this case.

Alternatively, the subscriber may verbally follow up, after verbally inputting the called party identity, with the location where the called party may be found (block 414), again preferably after the preposition "AT." An example of such a syntax may be "CALL MICHAEL SMITH AT HOME." In this case, the telephony server needs to access the subscriber's phone book and/or a predesignated electronic telephone directory (e.g., a public phone book) to determine the telephone number for the called party at the location inputted (in this case, Michael Smith at his home). In one embodiment, the locations specified preferably correspond directly to the fields of the contact records in the subscriber's phone book. Representative locations that are also fields in electronic telephone books include "HOME", "WORK", "ALTERNATE," "MOBILE" and the like.

Alternatively, the subscriber may simply verbally announce the called party without further following up with a telephone number or a location (as shown in path 416). An example of such a syntax may be "CALL MICHAEL SMITH." In this case, the telephony server needs to access the subscriber's phone book and/or a predesignated electronic telephone directory to determine the contact information for the called party. Since the contact record for Michael may include several possible telephone numbers for calling, the selected contact number may be selected in accordance to some predefined rule. By way of example, the subscriber or the unified messaging system or the called party may specify in advance that if no location is supplied for the called party, a given location is to be assumed (e.g., work).

Once the telephone number is ascertained, the telephony server preferably formulates a verbal confirmation of the outbound call request and presents such verbal confirmation to the subscriber to be verified prior to actually initiating the outbound call. This is desirable since verbal inputs are fraught with ambiguities, and errors may occur even if voice recognition is completely reliable.

In accordance with a particularly advantageous aspect of the present invention, complex commands involving multiple parties or telephone numbers may also be issued. With reference to FIG. 4, the subscriber may also signify that additional telephone numbers and/or parties are involved by the word "AND" (block 417) or a similar conjunctive word. An example of such a syntax may be "CALL MICHAEL SMITH AT HOME AND AT WORK." In this case, after the word "AND" is encountered at block 417, either called party or the preposition "AT" is expected.

If the preposition "AT" is encountered, paths 418 and 420 are taken to allow additional telephone numbers to be contacted. In fact, the subscriber can input as many telephone numbers as he wishes for the first called party (e.g., Michael Smith in this case). By way of example, such a syntax may be "CALL MICHAEL SMITH AT HOME AND AT WORK AND AT MOBILE" to request that the home number, the work number, and the mobile number to be tried at once. In this case, the telephony server may be programmed to require the called party to respond in a particular manner (e.g., pressing a certain key on the keypad upon being prompted) to ascertain that the person answering the call is the intended called party prior to coupling the outbound call path with the inbound call path to complete the end to end connection. Advantageously, this feature allows the called party to be located quickly, which is important for callers who may need quick or emergency attention from a called party (such as a medical, business, or personal emergency).

Another syntax may be "CALL MICHAEL SMITH AT HOME AND RICHARD BROWN AT WORK." In this case, more than one party is involved in the call. After the word "AND" is encountered at block 417, paths 418 and 424 are taken to allow the subscriber to input as many additional called parties as he wishes. When multiple parties are involved in a simultaneous call, it may be implicitly understood or be specified as an option in advance, in one embodiment, that the subscriber wishes to have multiple parties called at once and to get connected to the first party, with all other parties being dropped. Alternatively, it may be implicitly understood or be specified as an option in advance, in one embodiment, that when multiple parties are involved in a simultaneous call, the subscriber wishes to teleconference, and the call circuit should be made simultaneously to all parties. Further, the subscriber may more explicitly employ the action word "TELECON" or "TELECONFERENCE" in place of the action word "CALL" to specify that the call to be made is a teleconference.

Thus far, the discussion has centered on calls to be made simultaneously. However, the subscriber may also issue the qualifying word "THEN" (block 422) to specify that the calls should be made in a sequential manner (i.e., the second call should be placed after the first call is finished). An example of such a syntax may be "CALL MICHAEL SMITH AT HOME AND THEN RICHARD BROWN AT WORK". In this case, after the word "THEN" is encountered at block 422, the paths 426 and 424 are taken. Michael Smith is tried first at his home number and the call to Richard Brown is not initiated until the call to Michael Smith is finished or fails. Of course the subsequent call may have other allowable syntax of FIG. 4 as well. An example is "CALL MICHAEL SMITH AT HOME AND THEN RICHARD BROWN," which results in paths 426, 424, and 416 to be taken. Michael Smith being called at home first and Richard Brown being called at some default number after the call to Michael Smith is completed or fails. Another example is "CALL MICHAEL SMITH AT HOME AND THEN RICHARD BROWN AT 831-123-4567," which results in paths 426, 424, 430, and 432 being taken. Michael Smith being called at home first and the telephone number "831-123-4567" is called next after the call to Michael Smith is completed or fails. Another example is "CALL MICHAEL SMITH AT HOME AND THEN 831-123-4567," which results in paths 426 and 434 being taken. Michael Smith being called at home first and the telephone number "831-123-4567" is called next after the call to Michael Smith is completed or fails. Yet another example is "CALL MICHAEL SMITH AT HOME AND THEN AT WORK," which results in paths 426 and 420 to be taken. Michael Smith being called at home first and then at work after the call to Michael Smith at home is completed or fails. Advantageously, the syntax flow of FIG. 4 permits the subscriber to flexibly input the information needed to make the call or calls in completely natural and intuitive ways, and can structure the call to as many locations, as many called parties, and in any temporal order as he wishes.

Figure 5:
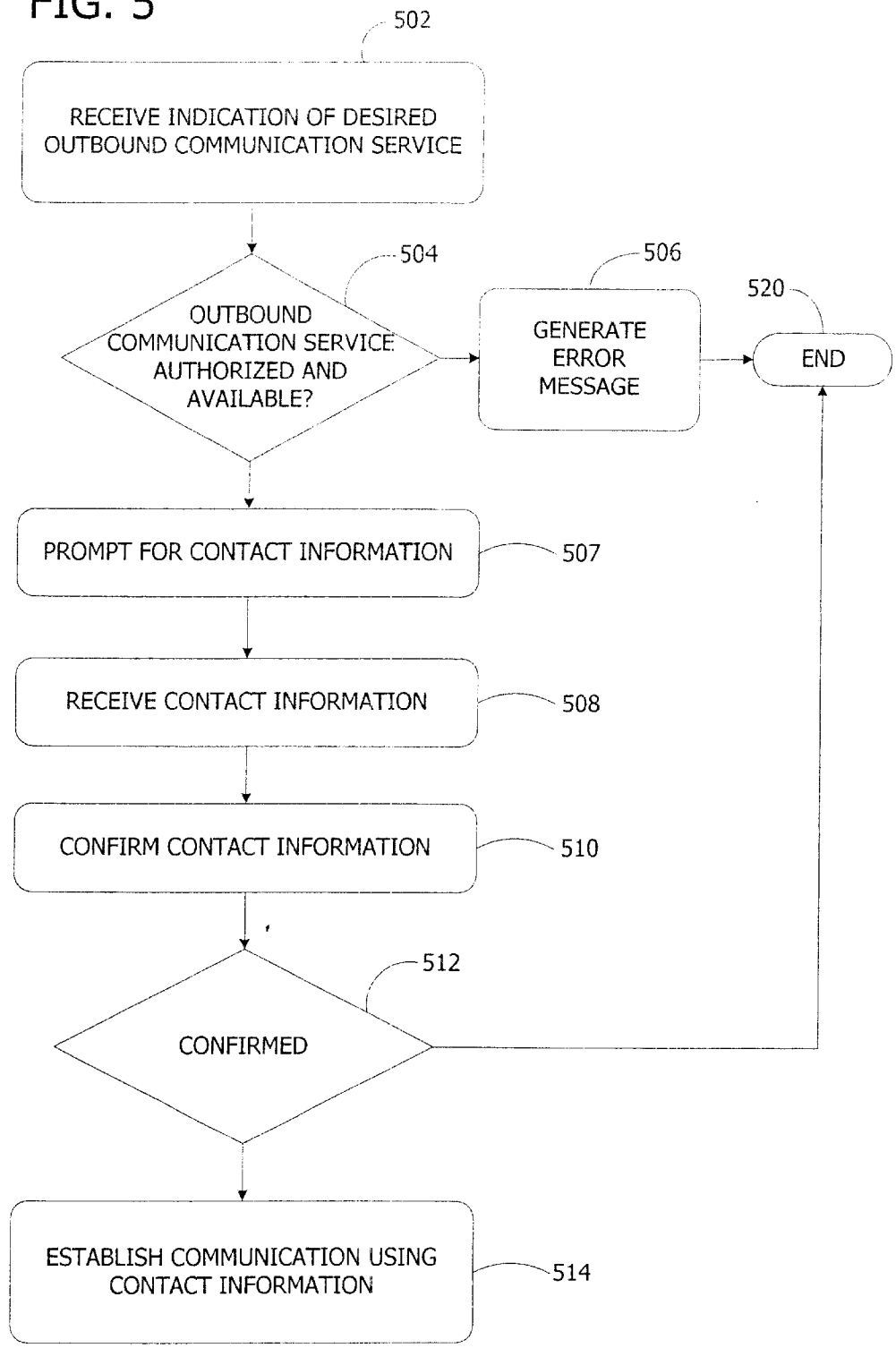
FIG. 5 illustrates, in accordance with one embodiment of the present invention, a process for verbally inputting the various pieces of data in response to a system prompt for the purpose of establishing outbound calls through the unified messaging system.

In one embodiment, the subscriber may verbally input the various pieces of data in response to a system prompt. With reference to FIG. 5, the telephony server may first prompt the user for the outbound service desired (block 502). If the outbound communication service cannot be ascertained, not available, or not authorized for this subscriber (as determined in block 504), the telephony server may generate an error message and communicate the error to the subscriber (block 506). The outbound communication service is unascertainable if the subscriber specifies a communication service that is either unavailable through the unified messaging system, or unauthorized for the subscriber, or if the subscriber's response cannot be understood by the voice recognition engine. Once the outbound communication service desired is ascertained from the subscriber's verbal response, the telephony server may next prompt for the contact information (block 507). At this point, the subscriber may input either the called party identification (optionally at a specified address) or the telephone number (or email address if email is involved) to be used in accordance to the syntax described in connection with FIG. 4.

In block 508, the service-appropriate contact information is received and/or derived from information input by the subscriber. The service-appropriate contact information is of course ascertained in view of the outbound communication services earlier specified. By way of example, if the outbound service is "CALL" or "PAGE" or "FAX," a string of number may be assumed to be the service-appropriate contact information. As a further example, if the outbound service is "EMAIL", the string of alphanumerics that includes the word "at" (e.g., michaelsmith@aol.com) may be understood to be the service-appropriate contact information for this mode of outbound communication.

An exemplary process for obtaining and/or deriving the contact information for outbound calls from an address book (optionally utilizing information from a calendar entry) is discussed later herein. In block 510, the telephony server may then formulate a confirmation message using the available information (e.g., "CALL 831-111-2222") and furnishes the confirmation message to the subscriber for verification. Once verified (as determined by block 512), the telephony server may cooperate with an appropriate server to establish the outbound communication (block 514). Depending on the communication service desired, outbound communication may be established via any of the outbound email server, the outbound call server, the outbound fax server, the outbound pager server. and the like.

Figure 6:
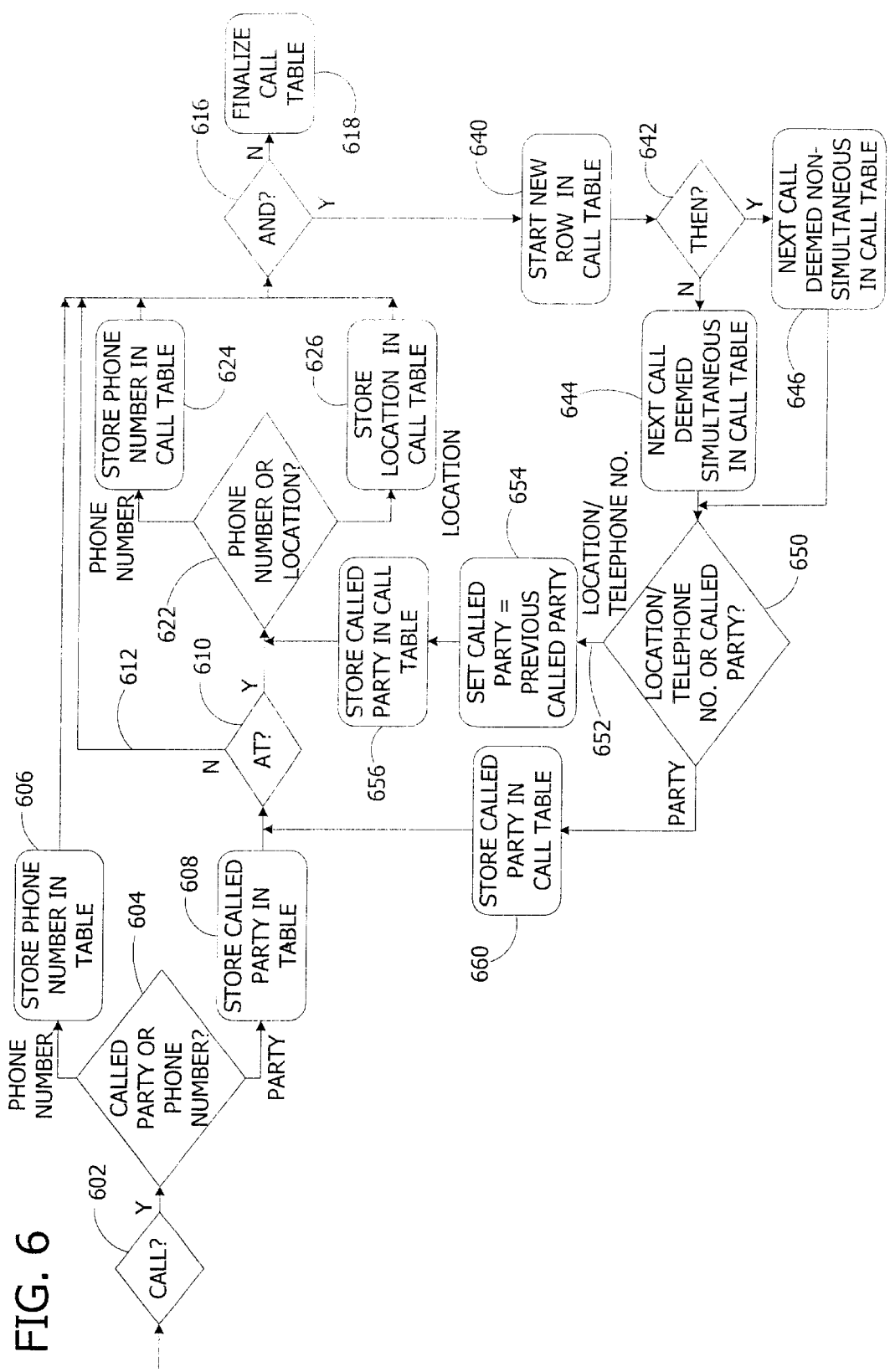
FIG. 6 illustrates, in accordance with one embodiment of the present invention, a process for receiving and parsing contact information verbally input by the subscriber for the purpose of placing outbound calls.

FIG. 6 illustrates, in accordance with one embodiment of the present invention, a process for receiving and parsing contact information verbally input by the subscriber for the purpose of placing outbound calls. As mentioned, the subscriber may place outbound calls by calling his account at the unified messaging system and indicating that he wishes to place an outbound call, preferably after being properly authenticated. The subscriber may indicate his desire to place an outbound call by either dialing a digit on the keypad or more preferably verbally announce such choice (e.g., "CALL" as in block 602). As with all other verbal inputs, the subscriber's verbal commands are received by the telephony server and processed by voice recognition hardware and/or software, either at the telephony server or on another server of the unified messaging system.

In block 604, the next verbal input is expected to be either the called party or contacting data (such as a phone number). In one embodiment, if a string of numbers having a telephone number format is received, the verbal input of block 604 is assumed to be a phone number. Of course, if the service chosen is outbound emails, the contacting data may be a word or phrase representative of an email address. If the verbal input of block 604 is not contacting data, it may be assumed to be a called party's identity (a subsequent error handling routine described herein will determine whether the called party's identity is valid). If the phone number is verbally input, the phone number is stored in a call table (block 606). In one embodiment, the verbal input of block 604 is assumed to be any verbal input after the action word (e.g., "AND") and before either the word "AT" (block 610), the word "AND" (block 616), the terminating word that indicates that the verbal command is complete (e.g., "GO" or "DONE") or upon the expiration of a predefined period (which signifies the end of the verbal command entry).

If the next verbal input after the telephone number is not the word "AND" (block 616), the process of inputting call information ends and the next step is block 618 wherein the call table is finalized in preparation for the telephony server to make the outbound call(s).

To further elaborate on the call table, FIG. 7 illustrates, in accordance with one embodiment of the present invention, a call table for storing information regarding calls to be made by the unified messaging system in response to the subscriber's verbal input. Each row of FIG. 7 represents an outbound call to be made by the unified messaging system (and more specifically by the telephony server) responsive to verbal commands by the subscriber. Multiple rows are provided since, as mentioned earlier, the process permits complex commands involving multiple called parties, multiple phone numbers, and different temporal orders to be received from the subscriber.

Each row includes information pertaining to the identity of the called party (if any), the location where the called party may be found (if any), and the phone number (which may be verbally furnished by the subscriber or derived by the unified messaging system from information verbally provided by the subscriber). Each row also includes the call order, which signifies the temporal order of each call. The call order is represented by a number, with a larger number indicating a later temporal order. If multiple rows have the same call order number, it is understood that the calls are to take place simultaneously (as in the situation where the subscriber wishes to find someone or where a teleconference call is desired).

The call table of FIG. 7 is depicted with the call information entered as they are verbally input from the subscriber. As will be described later, the call table will be filled out with information verbally input by the subscriber. After the subscriber finishes verbally inputting the call information, if the phone number is missing from any row, a process will be initiated to ascertain the missing phone number for that row, to remove that row (upon consent by the subscriber) if the missing phone number cannot be ascertained, or to terminate the session all together (upon consent by the subscriber) if the missing phone number cannot be ascertained. Alternatively, the phone number for each row may be ascertained after entry for that row is completed without waiting for the subscriber to finish inputting all verbal commands. When the telephone numbers are filled out for all rows, the telephony server may begin making the outbound calls using the order specified by the call order associated with each row.

With reference back to FIG. 6, if the verbal input information in block 604 is not a phone number, it may be assumed to be a called party identity. In block 608, the called party identity is stored in the call table. In block 610, if the next verbally input word is not "AT," the process takes path 612 to block 616, wherein it is determined if the next verbal input is the word "AND." The verbal input "AND" signifies that this call involves more than a single phone number. If not (e.g., if the timeout expires for additional verbal input or if the subscriber input the termination action word for the telephony to signify that the process of verbally inputting commands has ended), the process moves to block 618 to finalize the call table.

On the other hand, if the next verbal input after the called identity party (block 608) and the word "AT" (block 610) is a telephone number or location (block 622), the process proceeds to either block 624 or 626, depending on the next verbal input. In one embodiment, if a string of numbers having a telephone number format is received, the verbal input of block 622 is assumed to be a phone number. In this case, the verbally input phone number is recognized and stored in the call table (block 624). Otherwise, it may be assumed to be a location (a subsequent error handling routine described herein will determine whether the input location is valid) and stored in block 626. In one embodiment, the verbal input of block 622 may be assumed to be any string of alphanumerics that ends with the word "AND" (which indicates that there is additional contact information to follow) or the termination action word indicating that verbally input contact information has completed (e.g., "GO" or "START") or upon the expiration of a timeout period that signifies that the process of verbally inputting commands has ended.

From either block 624 or 626, the process proceeds to block 616 wherein it is determined if the next verbal input is the word "AND." The verbal input "AND" signifies that this call involves more than a single phone number. If not (e.g., if the timeout expires for additional verbal input or if the subscriber input the termination action word to signify that the process of verbally inputting commands has ended), the process moves to block 618 to finalize the call table.

If the verbal input "AND" is received following either block 606, block 610 (via path 612), block 624 or block 626, it is understood that there may be additional contact information to follow and multiple telephone numbers may be involved. In this case, the process moves to block 640 wherein a new row in the call table is created to handle the potential next outbound call, which may be necessitated if the additional contact information to be followed is valid.

After block 640, the process checks for the next verbal input to determine whether the next verbal input is the word "THEN" (or another suitable temporal order word such as "BEFORE") which indicates a temporal order of the new outbound call relative to the last call (block 642). If the next verbal input is not "THEN" or another temporal order word, it is understood that the next call is to be made substantially simultaneously with the previous call (block 644), i.e., either a find situation or a teleconference. In this case, the call order of this row will be the same as the last row. By way of example, if the last row has a call order of "1," the new row representing the next call will also have a call order of "1."

On the other hand, if the next verbal input is the word "THEN" (or another suitable temporal order word such as "BEFORE" or "AFTER" or "FIRST" or the like), it is understood that the next call is to be made with the temporal order specified, i.e., the calls will be nonsimultaneous. By way of example, if the word "THEN" is encountered, the newly created row will have the call order of "3" if the previous row (i.e., the previous outbound call) has the call order of "2." Appropriate ordering may be made with another temporal order word (e.g., "BEFORE," or "AFTER" or "FIRST/SECOND" or the like).

From either blocks 644 or 646, the process proceeds to block 650 wherein the next verbal input is analyzed to determine whether it represents a telephone number or a location, or whether it represent a new called party. In one example, the check at block 650 is performed by checking for the preceding word "AT," the presence of which implies that what follows is a telephone number or a location. An example of this syntax may be "CALL MICHAEL SMITH AT HOME AND AT WORK" or "CALL MICHAEL SMITH AT HOME AND AT 831-666-1234." If the answer in block 650 is yes (i.e., the verbal input is either a telephone number or a location), the process moves takes path 652. In this path, it is assumed that the called party has not changed. In this case, the called party of the current row in the call table is set to be equal to the called party of the previous row (block 654) and the called party is then stored in the current row of the call table (block 656). Thereafter, the process moves to block 622 to fill out either the location or the telephone number for the current row in the manner described earlier.

On the other hand, if the test at block 650 indicates that the next verbal input is not a location or a telephone number (e.g., by checking for the preceding word "AT" as described earlier), the process assumes that a new called party has been input. An example of this syntax may be "CALL MICHAEL SMITH AT HOME AND JOHN DOE AT WORK" or "CALL MICHAEL SMITH AT HOME AND JOHN DOE AT 831-666-1234" OR "CALL MICHAEL SMITH AT HOME AND JOHN DOE." In this case, the process moves to block 660 to store the new called party's identity (ascertained in block 650) in the new row of the call table (a later process will check for the validity of the called party identity in the call table). Thereafter, the process returns to block 610 to obtain additional information, if any, about the new called party. By way of example, there may be no additional information (path 612), or a phone number (block 624) or a location (block 626) may be verbally input next for the new called party.

Figure 8:
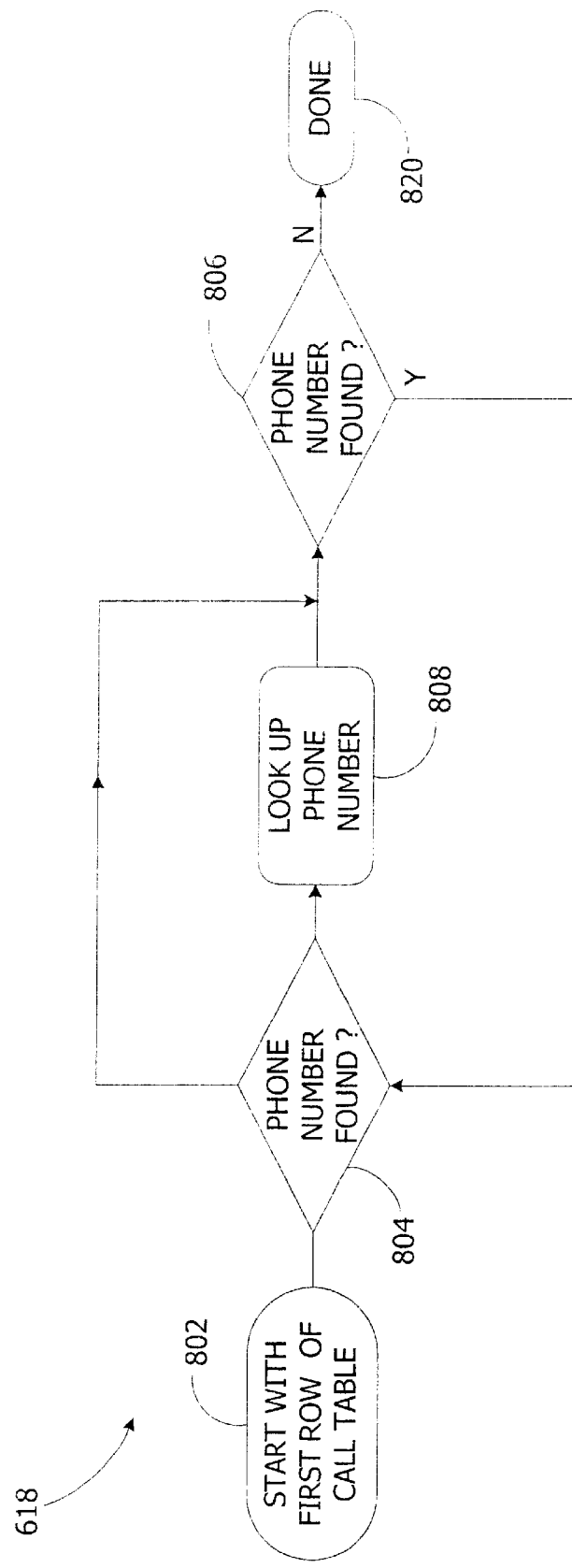
FIG. 8 illustrates, in accordance with one embodiment of the present invention, a process for finalizing the call table in preparation for the telephony server to make outbound calls.

FIG. 8 illustrates, in accordance with one embodiment of the present invention, a process for finalizing the call table in preparation for the telephony server to make outbound calls. In step 802, the process starts with the first row of the table. If the service-appropriate contact information is present (as determined in block 804), the process proceeds directly to block 806 wherein it is ascertained whether there is another row to check. The service-appropriate information is a telephone number in this case (since the service employed is the outbound call service). For other services, such as outbound faxes, outbound voicemails, outbound pages, the service-appropriate information may be a phone number (e.g., a telephone number in the case of outbound calls or faxes or pages, an email address in the case of outbound emails, or the like). for outbound emails, the service-appropriate contact information is of course an email address.

If the telephone number is present in the first row, an outbound call can be made with the telephone number present. If desired, the telephony server may be endowed with some intelligence to perform some sanity check on the telephone number of the row, e.g., understand that if a telephone number is a long distance number, certain preceding digits may be required. On the other hand, if the phone number is not present for the current row (as determined in block 804), the process proceeds to block 808 wherein the phone number is looked up. Block 808 will be discussed in greater detail, in accordance with one embodiment of the present invention, in a subsequent FIG. 9 herein. The process next proceeds to block 806 to check whether there is another row to look up the phone number. Note that the process proceeds to block 806 irrespective whether the phone number look up step is successful. Details pertaining to error handling if the phone number look up step is unsuccessful is discussed in greater detail in a subsequent FIG. 9 herein. Once all the rows are processed, the step of finalizing the call table in preparation for the telephony server to make the outbound calls ends (block 820).

Figure 9:
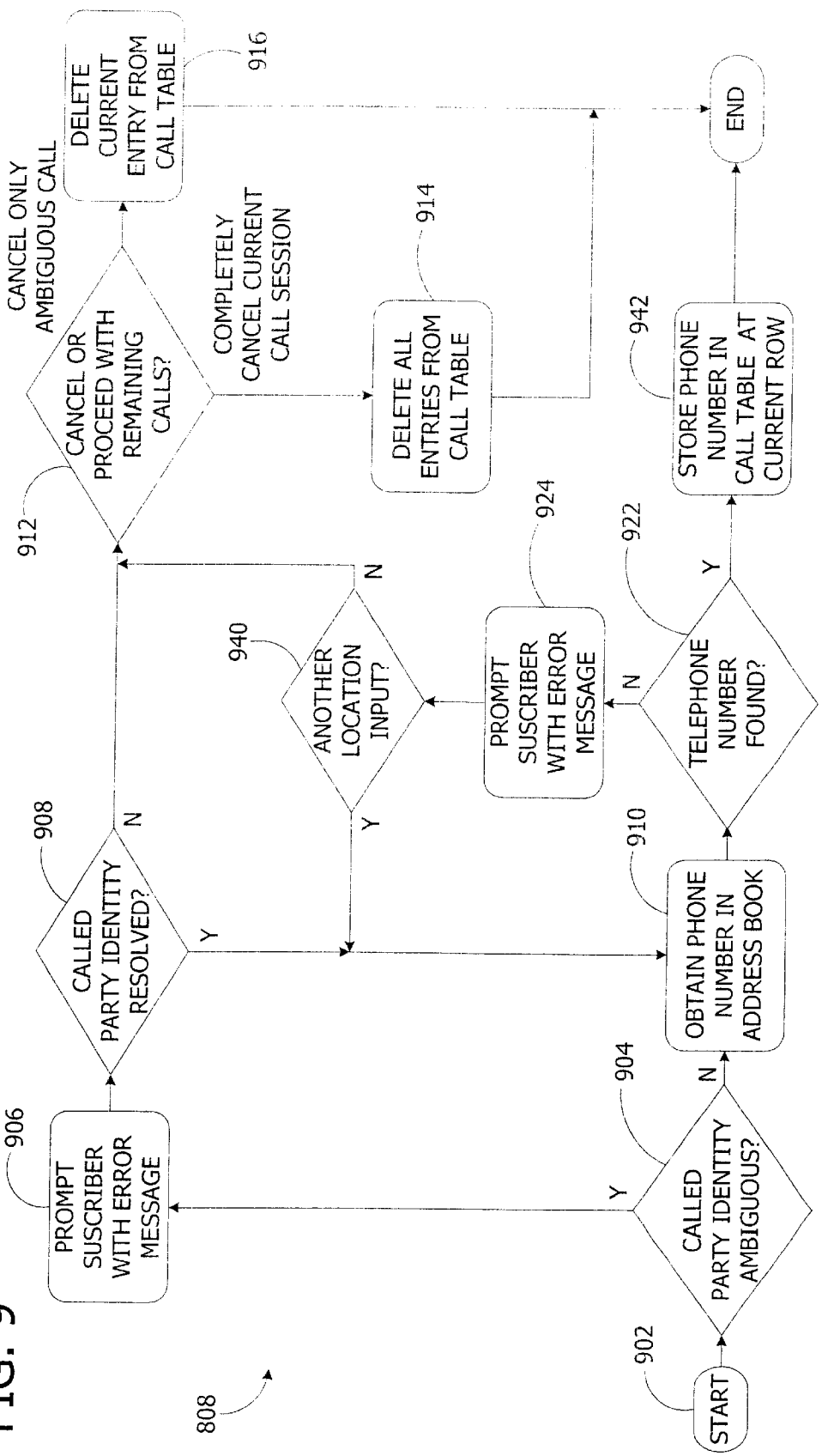
FIG. 9 illustrates, in accordance with one embodiment of the present invention, a process for looking up the phone number if such is not present in a row of the call table.

FIG. 9 illustrates, in accordance with one embodiment of the present invention, a process for looking up the phone number if such is not present in a row of the call table. From the start block 902, the process accesses the subscriber's electronic address book (or if preferred, some designated available electronic phone book) and ascertains whether the called party identity associated with the row is ambiguous or undetermined (block 904). By way of example, if the called party is not in the phone book, the called party identity may be deemed undetermined. As another example, if there are multiple people in the phone book with the same identity (e.g., first and/or last name), the called party identity may be deemed ambiguous. In either case, the process moves to block 906 to resolve the identity of the called party with the subscriber. By way of example, the subscriber may be presented with a list of names of called parties that are similar and asked to pick. As another example, the subscriber may be asked to simply enter another called party identity. If resolved (as determined in block 908), the process proceeds to block 910 where the service-appropriate contact information (e.g., a telephone number in the case of an outbound call) associated with the called party identity is looked up.

On the other hand, if the called party identity cannot be resolved, the subscriber may be asked (in block 912) to either cancel the call session entirely or to simply remove this row (and thus this particular outbound call) from the table of outbound calls to be made by the telephony server. If the subscriber wishes to cancel the current calling session entirely, all entries from the call table are deleted (block 914). On the other hand, if multiple outbound calls are involved (as in the case where the subscriber wishes to make multiple outbound calls simultaneously or to teleconference multiple parties), the subscriber may simply wishes to have only the current entry associated with the unresolved called party identity removed from the call table and to allow other outbound calls of the current call session to proceed (block 916).

If the called party identity is unambiguous (determined in block 904) or resolved satisfactorily (determined in block 908), the process proceeds to block 910, wherein the phone number is obtained from either the subscriber's address book or another available public directory using the location specified by the subscriber. As mentioned, it is preferable that the location entered corresponds to the phone number fields (whether "home," "office," "mobile," "main phone number," "alternate number" or the like) in the address book. If a location is not specified (as in the case where path 612 is taken in FIG. 6), the location may be assumed to be some predefined default location (e.g., assume "home" if the location is not specified). The default location may be set by the subscriber who makes the call, the unified messaging system, or the called party itself.

In block 922, the process ascertained whether the telephone number can be found in the address book. The telephone number may not be found if, for example, the location is not valid (e.g., not correspond to a phone number field in the address book) or if the location is valid but there is no telephone number entry for that location for this called party in the address book. In this case, the process proceeds to block 924 wherein the subscriber is prompted with an error message and optionally given an opportunity for inputting another location. If the user declines to verbally input another location (block 926 and path 928), the process proceeds to block 912 wherein the user is again given the option of either canceling the call session entirely or simply cancel the current entry in the call table. On the other hand, if another location is entered (block 940) the process returns to block 910 to attempt to look up the phone number.

On the other hand, if the telephone number is found in the address book (as determined in block 922), the process proceeds to block 942 to store this telephone number in the call table at the current row. The same action takes place if the subscriber wishes to enter the phone number directly instead of entering another location in block 940, i.e., the process may proceed to block 942 to store this input telephone number in the call table at the current row. In block 950, the process of looking up the phone number in address book of FIG. 9 ends.

FIG. 10 shows the exemplary call table of FIG. 7 after the phone numbers have been ascertained for the first three rows and the subscriber, after being prompted by the process (at step 924 of FIG. 9) that the location "golf course" does not exist, decided to delete the call to Matt White at the golf course. Since all rows have telephone numbers, the telephony server may now proceed with attempting to make the outbound calls, with Michael Smith and John Doe being called simultaneously first, to be followed by the call to Richard Brown thereafter.

Figure 11:
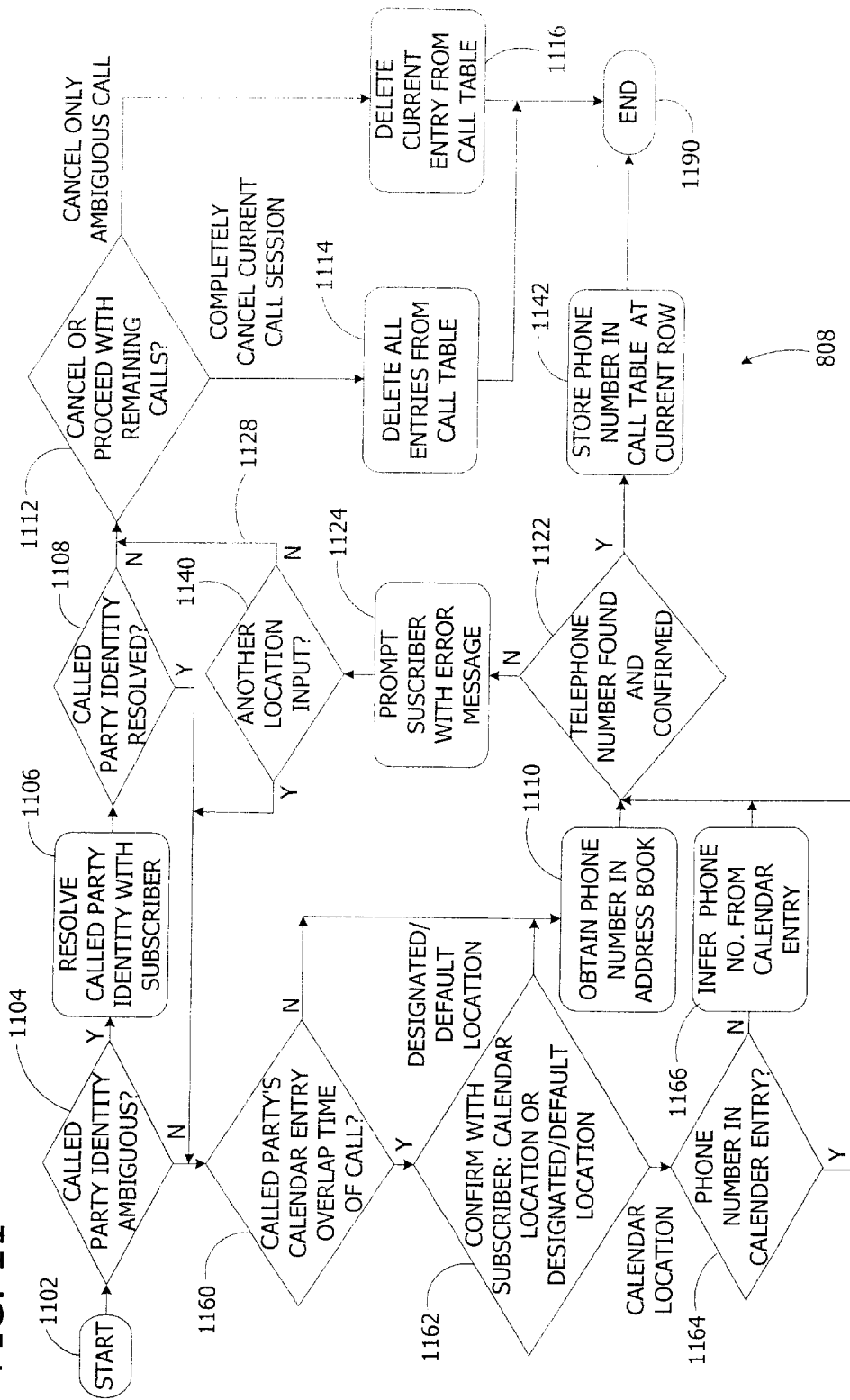
FIG. 11 illustrates, in accordance with one embodiment of the present invention, a process for looking up the phone number if such is not present in a row of the call table, which also includes an intelligent calendar search feature.

FIG. 11 illustrates, in accordance with one embodiment of the present invention, a process for looking up the phone number if such is not present in a row of the call table (e.g., block 808 of FIG. 8), which also includes an intelligent calendar search feature. From the start block 1102, the process accesses the subscriber's electronic address book (and/or if preferred, some designated available electronic phone book) and ascertains whether the called party identity associated with the row is ambiguous or undetermined (block 1104). By way of example, if the called party is not in the phone book, the called party identity may be deemed undetermined. As another example, if there are multiple people in the phone book with the same identity (e.g., first and/or last name), the called party identity may be deemed ambiguous. In either case, the process moves to block 1106 to resolve the identity of the called party with the subscriber. By way of example, the subscriber may be presented with a list of names of called parties that are similar and asked to pick. As another example, the subscriber may be asked to simply enter another called party identity.

Is If the called party identity is unresolved (as determined in block 1108), the subscriber may be asked (in block 1112) to either cancel the call session entirely or to simply remove this row of the call table (and thus this particular outbound call) from the table of outbound calls to be made by the telephony server. If the subscriber wishes to cancel the current calling session entirely, all entries from the call table are deleted (block 1114). On the other hand, if multiple outbound calls are involved (as in the case where the subscriber wishes to make multiple outbound calls simultaneously or to teleconference multiple parties), the subscriber may simply wishes to have only the current entry associated with the unresolved called party identity removed from the call table and to allow other outbound calls of the current call session to proceed (block 1116).

If the called party identity is unambiguous (determined in block 1104) or resolved satisfactorily (determined in block 1108), the process proceeds to block 1160, wherein the called party's calendar is consulted to determine whether there is a calendar entry that overlaps with the time of the call. In a network environment such as a local area network (LAN), a wide area network (WAN) and/or the Internet, such calendaring information is oftentimes publicly available at some level of specificity (the exact level may be customized to protect privacy), particularly in the databases of collaboration-type programs.

If the called party's calendar cannot be found or if there is no calendar entry of the called party's calendar that overlaps the time of call, the process proceeds to block 1110 wherein the phone number is obtained from the address book using the location specified by the subscriber or a predefined default location. In this case, the calendar is essentially ignored. As mentioned, it is preferable that the location entered corresponds to the phone number fields (whether "home," "office," "mobile," "main phone number," "alternate number" or the like) in the address book. If a location is not specified (as in the case where path 612 is taken in FIG. 6), the location may be assumed to be some predefined default location (e.g., assume "home" if the location is not specified). The default location may be predefined by either the subscriber who makes the call, the unified messaging system, or the called party himself.

On the other hand, if there is a calendar entry in the called party's calendar that overlaps the time of call (as determined in block 1160), the process proceeds to block 1162 wherein it informs the subscriber with the found information (i.e., the calendar entry) and asks whether the subscriber still wishes to place the call at the designated/default location or whether the subscriber wishes to attempt to contact the called party at the location suggested by the calendar entry found. Note that this information itself is useful to help the subscriber determines the availability of the called party even if the calendar entry itself turns out to contain no specific information that can be used to infer a phone number since the subscriber in this case is at least informed of the calendar entry to have at least some idea about the availability of the called party even if the call cannot be made and/or the called party cannot be found. An example of this situation is when the calendar information simply is of the "free/busy" type that indicates whether the called party is available/not available but contains no further explanatory information. Another exemplary use of this feature may be to allow the subscriber to check the calendar entry of a particular called party (e.g., by the verbal command "CHECK CALENDAR MICHAEL SMITH" wherein the action words "check calendar" signifies to the telephony server to do the calendar checking described herein but not to make the call if there is no calendar entry that overlaps the time of calendar checking).

If the subscriber chooses to continue to place the call at the designated/default location, the process proceeds to block 1110 wherein the phone number is obtained from the address book as mentioned earlier.

If the subscriber instead choose to take advantage of the calendar information, the process proceeds to block 1164 wherein the calendar entry is parsed to see whether the called party had entered a telephone number associated with the appointment of the calendar entry. This is because people oftentimes enter a telephone number in connection with an appointment (e.g., to have a number handy to call and cancel the appointment or to call for directions, etc.). In one embodiment, the calendar entry is parsed and analyzed for the presence of a string of numbers suggestive of the phone number. If the phone number is found in the calendar entry, the process proceeds to block 1122 to confirm the telephone number with the subscriber.

In block 1122, the process ascertained whether the telephone number had been found and confirmed by the subscriber (i.e., phone number found, if any, is preferably confirmed by the subscriber in step 1122). The telephone number may not be found if, for example, the location is not valid (e.g., not correspond to a phone number field in the address book), if the location is valid but there is no telephone number entry for that location for this called party in the address book. In this case or in the case that the subscriber refuses to confirm the phone number found (i.e., rejecting it as a phone number for use in placing the outbound call), the process proceeds to block 1124 wherein the subscriber is prompted with an error/status message and optionally given an opportunity for inputting another location. If the user declines to verbally input another location (block 1140 and path 1128), the process proceeds to block 1112 wherein the user is again given the option of either canceling the call session entirely or simply cancel the current entry in the call table.

On the other hand, if another location is entered (block 1140) the process returns to block 1160 to again attempt to obtain the phone number. If the subscriber chose to take advantage of the calendar information earlier but the calendar information failed to yield a telephone number that can be used, the subscriber can, in this loop, chooses to confirm in block 1162 that the earlier designated (or default if appropriate) location should be used to find the telephone number.

On the other hand, if no telephone number is detected in the calendar entry (as determined in block 1164), the process proceeds to block 1166 where it attempts to find the telephone number using the information in the calendar entry. Block 1166 is discussed in greater detail in connection with FIG. 12 herein. After the attempt, the process proceeds to block 1122.

If the telephone number is found and also confirmed by the subscriber as a suitable number for use in making the outbound call (as determined in block 1122), the process proceeds to block 1142 to store this telephone number in the call table at the current row. The same action takes place if the subscriber wishes to enter the phone number directly instead of entering another location in block 1140, i.e., the process may proceed to block 1142 to store this input telephone number in the call table at the current row. In block 1150, the process of looking up the phone number in address book of FIG. 11, which includes the intelligent calendar interface, ends.

Figure 12:
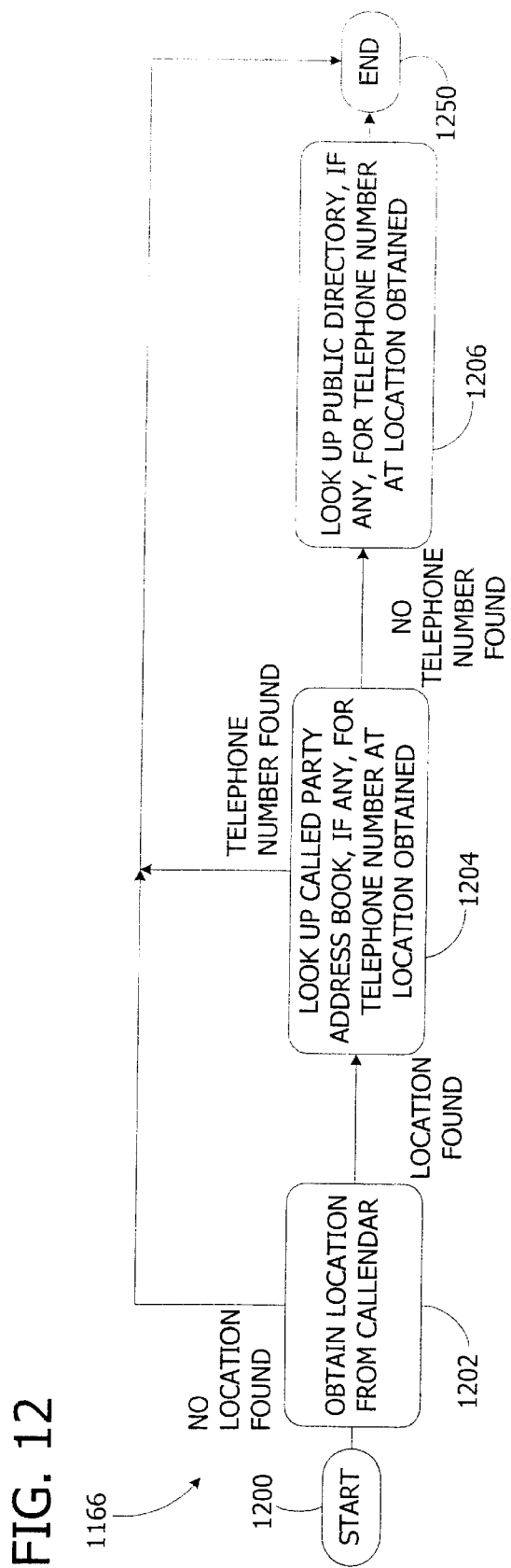
FIG. 12 illustrates, in accordance with one embodiment of the present invention, the process of attempting to infer a telephone number from the called party's calendar entry.

FIG. 12 illustrates, in accordance with one embodiment of the present invention, the process of attempting to infer a telephone number from the called party's calendar entry (such as in block 1166 of FIG. 11). In block 1202, the calendar entry is parsed to attempt to find an alphanumeric string suggestive of a location. In one embodiment, the parser looks for the alphanumeric string that follows the word "at." However, other more sophisticated natural language parsing techniques may also be employed to attempt to find the location information from the calendar entry. If no location can be ascertained from the calendar entry, the process proceeds directly to block 1250 wherein the process of FIG. 12 ends.

On the other hand, if a location is ascertained, the process then attempts to find a telephone number associated with that location in blocks 1204 and/or 1206. In block 1204, the called party's address book, if available and accessible, is consulted to ascertain the telephone number of the location found in block 1202. Again, if there are ambiguities, the subscriber may be prompted with information and/or further clarifying details. If the telephone number cannot be found (due to e.g., the fact that the called party's address book is unavailable and/or inaccessible or due to the fact that the called party's address book does not contain the telephone number sought for the location found in block 1202), the process proceeds to block 1206 wherein it attempts to consult other available directories for the telephone number of the location found in block 1202. By way of example, public telephone directories may be consulted or even the subscriber's own address book may be consulted. Irrespective whether a phone number is obtained, the process proceeds to block 1250 where the process of FIG. 12 ends and a telephone number, if any, is returned to the process that calls the process of FIG. 12. If the process of FIG. 12 successfully returns a telephone number, this telephone number then undergoes the confirmation process with the subscriber (block 1122 of FIG. 11) prior to being stored in the called table for use (if confirmed). If the telephone number is rejected (also in block 1122 of FIG. 11), the subscriber may be given an opportunity to furnish further information that may yield another number for use in making the outbound call (blocks 1140 of FIG. 11, the affirmative branch) or to cancel (blocks 1112 and 1114/1116 of FIG. 11).

While this invention has been described in terms of several preferred embodiments, there are alterations, permutations, and equivalents which fall within the scope of this invention. By way of example, although some of the discussion has centered on making outbound voice calls, it should be recognized that the inventive voice-based command structure may be implemented when other communication services are requested (e.g., outbound facsimile, outbound pager, outbound voice mails, outbound emails, etc). The adaptation of the voice-based command structure disclosed herein to the requirements of other servers should be apparent to the artisan given this disclosure. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for creating an end-to-end connection between a first telephone and a communication device through a unified messaging system, said creating said end-to-end connection between said first telephone and said communication device being performed responsive to verbal input from a user of said first telephone, comprising:

receiving at said unified messaging system said verbal input from said user through said first telephone;

recognizing an action word from said verbal input, said action word being indicative of a communication service desired by said user in creating said end-to-end connection;

recognizing at least one of a called party identity and contacting data from said verbal input after said detecting said action word;

entering said one of said called party identity and said contacting data in a record of a call table; and finalizing said call table after said user finishes with said verbal input, said finalizing said call table ensuring that said record of said call table includes service-appropriate contact information to permit said unified messaging system to create an outbound communication path of said end-to-end connection using said service-appropriate contact information, said finalizing including accessing a calendar database for said one of said called party identity and said contacting data, said calendar database being external to said unified messaging system and being accessed via a network, and ascertaining whether a calendar entry in said calendar database temporally overlaps a time of said creating said end-to-end connection.

2. The method of claim 1 wherein said action word represents an action word indicative of a telephone call, said communication device represents a second telephone different from said first telephone, and said service-appropriate contact information represents a telephone number.

3. The method of claim 2 wherein said finalizing further includes ascertaining one of a calendar-entry telephone number and a calendar-entry location from said calendar entry if said calendar entry temporally overlaps said time of said creating said end-to-end connection.

4. The method of claim 3 wherein said finalizing further includes consulting an electronic address book of said user to locate an address book telephone number if said calendar-entry location is ascertained.

5. The method of claim 3 wherein said finalizing further includes consulting a publicly available electronic address book to locate an address book telephone number associated with said calendar-entry location if said calendar-entry location is ascertained.

6. The method of claim 2 further comprising:

detecting one of a user-input telephone number and a location from said verbal input after said called party identity is detected; and entering said one of said user-input telephone number and said location into said record of said call table.

7. The method of claim 2 wherein said finalizing said call table includes consulting an electronic address book of said user to locate an address book telephone number if a telephone number is not present in said record prior to said finalizing, said consulting employs at least one of said called party identity and said location.

8. The method of claim 7 wherein said location is assumed to be a predefined default location if said location is not present in said record of said call table.

9. The method of claim 7 further includes permitting said user to cancel, via a verbal command, said creating said end-to-end connection if said address book telephone number cannot be located in said electronic address book during said consulting.

10. The method of claim 7 further includes permitting said user to verbally input another location if said address book telephone number cannot be located in said electronic address book during said consulting.

11. The method of claim 7 further includes permitting said user to verbally input another telephone number if said address book telephone number cannot be located in said electronic address book during said consulting.

12. The method of claim 2 wherein said finalizing said call table includes consulting an electronic address book of said user to ascertain whether there exists an address record having said called party identity;

ascertaining an address book telephone number associated with said address record having said called party identity; and entering said address book telephone number into said record of said call table if said address book telephone number is ascertained.

13. The method of claim 12 wherein said finalizing said call table further includes permitting said user to verbally input another location if said address book telephone number cannot be ascertained from said address record at said location.

14. The method of claim 12 wherein said finalizing said call table further includes permitting said user to verbally input another telephone number if said address book telephone number cannot be ascertained from said address record at said location, and entering said another telephone number into said record of said call table.

15. A method for permitting a user to create a plurality of outbound communication paths to a plurality of communication devices from a unified messaging system, said creating said plurality of said outbound communication paths being performed responsive to verbal input from a user through a first telephone, comprising:

receiving at said unified messaging system said verbal input from said user through said first telephone;

recognizing an action word from said verbal input, said action word being indicative of a communication service desired by said user in creating said end-to-end connection;

recognizing at least one of a first called party identity and first contacting data from said verbal input after said recognizing said action word;

entering said one of said first called party identity and said first contacting data in a first record of a call table;

recognizing a conjunctive word after said recognizing said at least one of said first called party identity and said first contacting data;

recognizing at least one of a second party identity and second contacting data from said verbal input after said detecting said conjunctive word;

entering said one of said second called party identity and said second contacting data in a second record of a call table; and finalizing said call table after said user finishes with said verbal input, said finalizing said call table ensuring that each record of said call table, including said first record and said second record, includes service-appropriate contact information to permit said unified messaging system to create an outbound communication path for said each record, wherein said finalizing includes ascertaining whether a calendar entry in a calendar database of a called party temporally overlaps a time of said creating said outbound communication path for said each record and, if a calendar entry temporally overlaps the time of said creating, requesting input from said user indicative of whether to finalize said call table.

16. The method of claim 15 wherein said action word represents an action word indicative of a telephone call, said communication device represents a second telephone different from said first telephone, and said service-appropriate contact information represents a telephone number.

17. The method of claim 16 wherein said finalizing further includes ascertaining one of a calendar-entry telephone number and a calendar-entry location from said calendar entry if said calendar entry temporally overlaps said time of said creating said outbound communication path for said each record.

18. The method of claim 17 wherein said finalizing further includes consulting an electronic address book of said user to locate an address book telephone number if said calendar-entry location is ascertained.

19. The method of claim 17 wherein said finalizing further includes consulting a publicly available electronic address book to locate an address book telephone number associated with said calendar-entry location if said calendar-entry location is ascertained.

20. The method of claim 16 further comprising etecting a temporal order word from said verbal input after said detecting said conjunctive word; and entering a temporal order in said second record, said temporal order being reflective of a temporal status of an outbound call associated with said second record relative to an outbound call associated with said first record, said temporal status being determined responsive to said temporal order word input by said user.

21. The method of claim 16 further comprising:

detecting one of a first user-input telephone number and a first location from said verbal input after said first called party identity is detected; and entering said one of said first user-input telephone number and said first location into said first record of said call table.

22. A computer-implemented method for contacting a party by a unified messaging system using calendar information associated with that party, the method comprising:

receiving and recognizing verbal input from a user;

identifying the party to be contacted from the received and recognized verbal input;

accessing via a network a calendar database external to said unified messaging system to obtain the calendar information associated with said identified party;

determining contact data for said identified party using the accessed calendar information;

ascertaining availability information indicating whether a calendar entry in the accessed calendar information temporally overlaps with a time of the verbal input;

verbally providing said determined contact data and said ascertained availability information to the user; and requesting input from the user indicative of whether to contact said identified party using the determined contact data.

23. The method of claim 22 wherein determining includes analyzing the accessed calendar information for a string of characters suggestive of the contact data.

24. The method of claim 22 wherein determining includes analyzing the accessed calendar information using a natural language parsing technique.

25. The method of claim 22 wherein the determined contact data is one of a phone number and a location.

26. The method of claim 25 wherein the determined contact data is a location, and wherein requesting includes requesting input from the user indicative of whether to contact said identified party at said location.

27. The method of claim 26 wherein the party is to be contacted by phone, the method further comprising obtaining a phone number for said location.

28. The method of claim 27 wherein obtaining includes obtaining said phone number from a telephone directory.

29. The method of claim 28 wherein the telephone directory is a telephone directory of said identified party, a telephone directory of a user, or a public telephone directory.

30. The method of claim 22 wherein requesting includes requesting input from the user indicative of whether to contact said party at a designated/default location.

31. A computer-implemented method for determining an availability of a specified party by a unified messaging system, the method comprising:

receiving and recognizing a verbal command from a user to examine calendar information for the specified party;

identifying the specified party from the received and recognized verbal command;

accessing via a network a calendar database external to said unified messaging system to obtain said calendar information for the specified identified party;

analyzing the accessed calendar information to determine availability information indicating an availability of the specified identified party including indicating whether a calendar entry in the accessed calendar information temporally overlaps with a time of the verbal command; and providing an indication of the determined availability information of the specified identified party to the user.

32. The method of claim 31 wherein analyzing includes analyzing the accessed calendar information using a natural language parsing technique.

33. The method of claim 31 wherein providing includes verbally providing said results of the analyzing to the user.

34. The method of claim 31 further comprising requesting input from the user indicative of whether to contact said identified party.

* * * * *

UNITED STATES PATENT AND TRADEMARK OFFICE
CERTIFICATE OF CORRECTION

PATENT NO.    : 6,574,599 B1                                              Page 1 of 1
DATED         : June 3, 2002
INVENTOR(S)   : Kang S. Lim et al.

It is certified that error appears in the above-identified patent and that said Letters Patent is hereby corrected as shown below:

Column 21,
Line 48, "Is If the" should read -- If the --.

Column 27,
Line 11, "etecting" should read -- detecting --.

Signed and Sealed this

Sixth Day of January, 2004

JAMES E. ROGAN
*Director of the United States Patent and Trademark Office*